US011152669B2

(12) United States Patent
Buck et al.

(10) Patent No.: US 11,152,669 B2
(45) Date of Patent: Oct. 19, 2021

(54) SCALABLE BATTERY MODULE

(75) Inventors: Derrick Buck, Pendleton, IN (US); Bruce Silk, Indianapolis, IN (US)

(73) Assignee: Enerdel, Inc., Indianapolis, IN (US)

( * ) Notice: Subject to any disclaimer, the term of this patent is extended or adjusted under 35 U.S.C. 154(b) by 0 days.

(21) Appl. No.: 13/508,770

(22) PCT Filed: Nov. 9, 2010

(86) PCT No.: PCT/US2010/055985
§ 371 (c)(1),
(2), (4) Date: May 9, 2012

(87) PCT Pub. No.: WO2011/057246
PCT Pub. Date: May 12, 2011

(65) Prior Publication Data
US 2012/0231318 A1    Sep. 13, 2012

Related U.S. Application Data

(60) Provisional application No. 61/259,412, filed on Nov. 9, 2009.

(51) Int. Cl.
*H01M 50/502*    (2021.01)
*H01M 10/647*    (2014.01)
(Continued)

(52) U.S. Cl.
CPC ....... *H01M 50/502* (2021.01); *H01M 10/613* (2015.04); *H01M 10/615* (2015.04);
(Continued)

(58) Field of Classification Search
None
See application file for complete search history.

(56) References Cited

U.S. PATENT DOCUMENTS

| 6,104,967 A | 8/2000 | Hagen et al. |
| 6,391,489 B1 | 5/2002 | Winch et al. |

(Continued)

FOREIGN PATENT DOCUMENTS

| RU | 67778 U1 | 6/2007 |
| RU | 2336600 C1 | 10/2008 |

(Continued)

OTHER PUBLICATIONS

International Search Report and Written Opinion, for PCT/US10/055985, dated Jan. 4, 2011, (8 pgs.).

(Continued)

*Primary Examiner* — Jonathan Crepeau
*Assistant Examiner* — Angela J Martin
(74) *Attorney, Agent, or Firm* — Faegre Drinker Biddle & Reath LLP

(57) ABSTRACT

A scalable battery module (10, 210) includes a plurality of similarly configured cell groupings (1251, 1851), a plurality of framed heatsinlc assemblies (50, 250), and a plurality of jumper tabs (32, 232). Each cell grouping (1251, 1751) includes a plurality of cell packs (52, 1752) electrically coupled in parallel including a negative terminal (70, 270) and a positive terminal (64, 264). Each plurality of framed heatsink assemblies (50, 250) is disposed between one cell pack (52, 1752) of the plurality of cell packs of each cell groupings (1251, 1751) and an adjacent cell pack (52, 1752) of the plurality of cell packs of each cell grouping (1251, 1751) and includes a thermally conductive sheet portion. Each of the plurality of jumper tabs (32, 232) electrically couples a negative terminal (70, 270) of one of the plurality of cell groupings (1251, 1851) to a positive terminal (64, 264) of an adjacent cell grouping (1251, 1851).

26 Claims, 14 Drawing Sheets

(51) Int. Cl.
  *H01M 10/613* (2014.01)
  *H01M 10/615* (2014.01)
  *H01M 10/6555* (2014.01)
  *H01M 10/625* (2014.01)
  *H01M 50/258* (2021.01)
  *H01M 50/209* (2021.01)
  *H01M 10/0525* (2010.01)

(52) U.S. Cl.
  CPC ....... *H01M 10/625* (2015.04); *H01M 10/647* (2015.04); *H01M 10/6555* (2015.04); *H01M 50/209* (2021.01); *H01M 50/258* (2021.01); *H01M 10/0525* (2013.01)

(56) References Cited

U.S. PATENT DOCUMENTS

| | | | | |
|---|---|---|---|---|
| 7,531,270 | B2* | 5/2009 | Buck et al. | 429/120 |
| 8,551,640 | B2* | 10/2013 | Hedrich | H01M 2/1077 429/158 |
| 2002/0022178 | A1 | 2/2002 | Asaka et al. | |
| 2003/0194605 | A1 | 10/2003 | Fauteux et al. | |
| 2003/0194608 | A1 | 10/2003 | Fauteux et al. | |
| 2004/0021442 | A1 | 2/2004 | Higashino | |
| 2006/0214631 | A1* | 9/2006 | Yoon | H01M 2/1061 320/112 |
| 2007/0080662 | A1 | 4/2007 | Wu | |
| 2007/0279953 | A1* | 12/2007 | Hoff et al. | 363/87 |
| 2009/0325051 | A1 | 12/2009 | Niedzwiecki | |
| 2010/0266883 | A1* | 10/2010 | Koetting | H01M 2/1077 429/96 |
| 2010/0316895 | A1 | 12/2010 | Hedrich et al. | |

FOREIGN PATENT DOCUMENTS

| | | | |
|---|---|---|---|
| WO | 2009/074421 | A1 | 6/2009 |
| WO | WO 2007/134320 | A2 | 7/2009 |
| WO | WO 2008/048751 | A2 | 7/2009 |

OTHER PUBLICATIONS

European Patent Office, Extended European Search Report for EP10829272.3, dated Dec. 11, 2013 (7 pages).
European Patent Office, Communication Pursuant to Article 94(3) EPC for EP10829272.3, dated Jul. 7, 2017, (4 pages).
Korean Intellectual Property Office, Notice of Preliminary Rejection for KR201207014636 with English translation, dated Jan. 19, 2017 (18 pages).
European Patent Office, Communication Pursuant to Article 94(3) EPC for EP10829272.3, dated Jul. 26, 2018, (5 pages).
International Preliminary Report on Patentability received for PCT Patent Application No. PCT/US2010/055985, dated May 24, 2012, 8 pages.

* cited by examiner

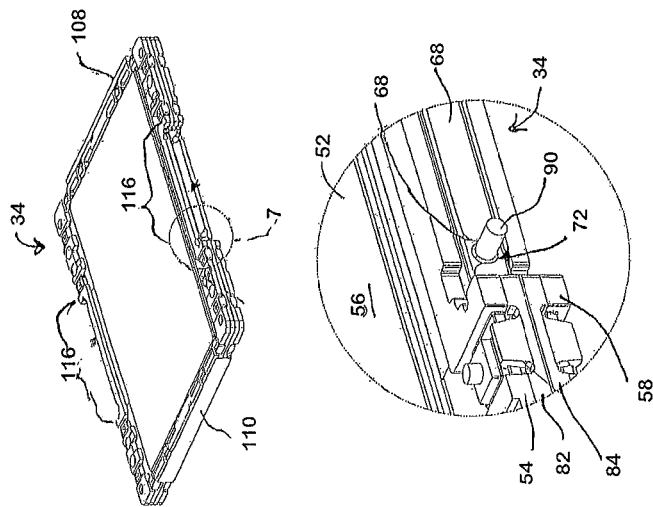
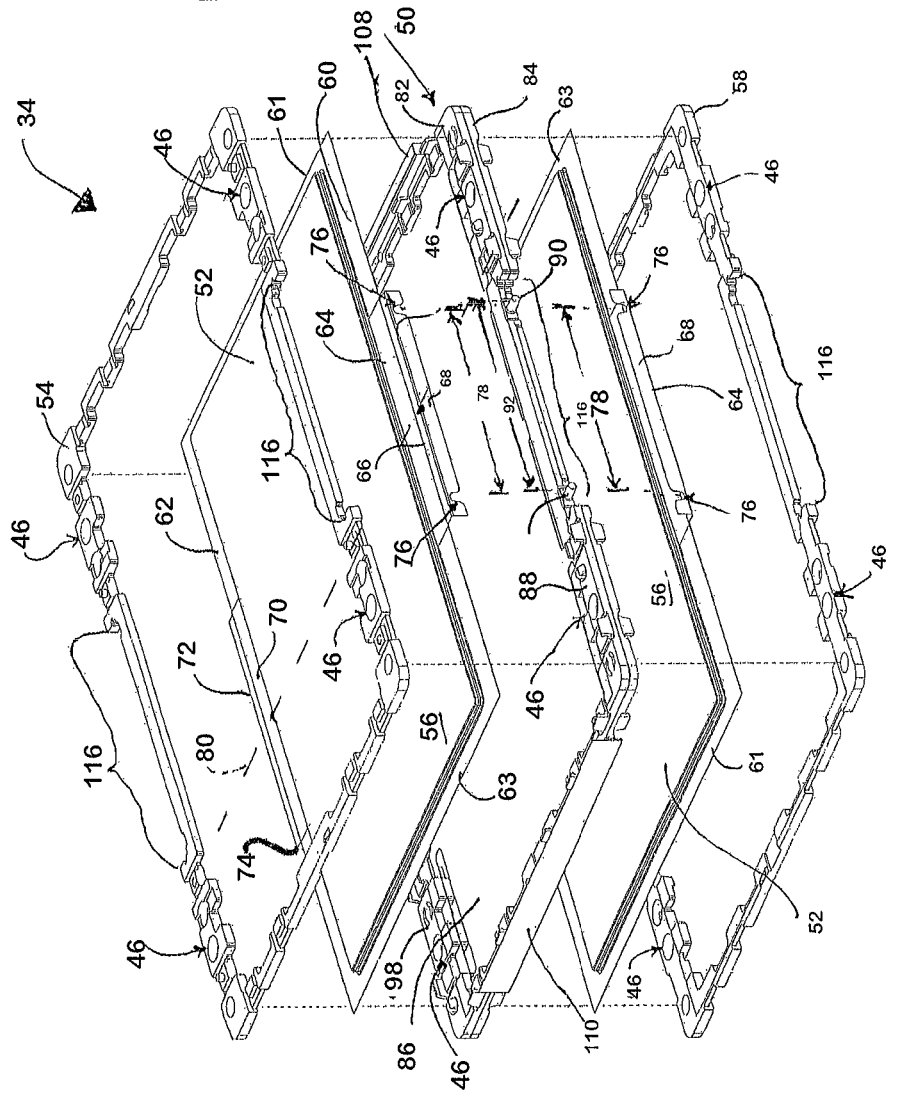

SCALABLE BATTERY MODULE

CROSS REFERENCE TO RELATED APPLICATION

The present application is a National Stage of International Application No. PCT/US2010/055985, filed Nov. 9, 2010 and claims the benefit of U.S. Provisional Application No. 61/259,412, filed Nov. 9, 2009, the disclosures of which are expressly incorporated by reference herein.

BACKGROUND AND SUMMARY

The subject invention relates to scalable battery modules having cells and more particularly, to a battery module pack for electric/hybrid vehicles having a cooling system or a heating system for cooling the cells within the battery pack.

Motor vehicles, such as, for example, hybrid vehicles ("HEV") use multiple propulsion systems to provide motive power. This most commonly refers to gasoline-electric hybrid vehicles, which use gasoline (petrol) to power internal-combustion engines (ICEs), and electric batteries to power electric motors. These hybrid vehicles recharge their batteries by capturing kinetic energy via regenerative braking. When cruising or idling, some of the output of the combustion engine is fed to a generator (merely the electric motor(s) running in generator mode), which produces electricity to charge the batteries. This contrasts with all-electric cars ("EV") which use batteries charged by an external source such as the grid, or a range extending trailer. Nearly all hybrid vehicles still require gasoline as their sole fuel source though diesel and other fuels such as ethanol or plant based oils have also seen occasional use.

Batteries and cells are important energy storage devices well known in the art. The batteries and cells typically comprise electrodes and an ion conducting electrolyte positioned therebetween. For purposes of simplicity, the term "cells" is used herein to mean unicells, bicells, or any other basic battery cell construction. Battery packs that contain lithium ion batteries are increasingly popular with automotive applications and various commercial electronic devices because they are rechargeable and have no memory effect. Storing and operating the lithium ion battery at an optimal operating temperature is very important to allow the battery to maintain a charge for an extended period of time.

EV and HEV manufacturers have different requirements for the battery packs that they utilize in their vehicles. Among the requirements that may differ are the overall voltage produced by the battery pack and the overall capacity of the battery pack. Battery packs are formed from individual battery cells that utilize different internal configurations but which include a first electrode, a second electrode and an electrolyte disposed between the first and second electrodes. Cells also typically include other components such as separator layers and current collectors. Based upon the size, configuration and chemical makeup of the first and second electrodes and the chemical makeup of the electrolyte, cells produce a specified voltage and exhibit a specified capacity. Similarly configured cells exhibit similar voltages and similar capacities.

Cells and batteries may be connected in series, in parallel, or in combinations of both. Each specific battery or cell exhibits a voltage and a capacity. Cells or batteries connected in series have the positive terminal of one cell or battery connected to the negative terminal of the other cell or battery. When cells or batteries having like voltages and capacities are connected in series, the overall voltage is increased (voltages of each cell or battery are essentially added together to determine the overall voltage when connected in series) but maintain the same overall capacity. Batteries or cells connected in parallel have their like terminals connected together (positive terminal is connected to positive terminal and negative terminal is connected to negative terminal). When cells or batteries having similar voltages and capacities are connected in parallel, the overall voltage of the combination remains the same while the overall capacity of the combination is greater than the capacity of the individual cells.

Cells or batteries may also be connected in series/parallel combinations. Utilizing the series/parallel combination, a battery pack may be developed having the desired overall voltage and overall capacity desired for the application with which the battery pack is to be utilized. There are an infinite number of ways to combine batteries and cells in series/parallel combinations. However, since it is typically preferred to combine only batteries and cells having similar voltages and capacities, only two methods of combining cells or batteries in a series/parallel combination will be described. Cells or batteries may be combined in parallel to form parallel subunits having the desired overall capacity and then various parallel subunits may be combined in series to obtain the desired overall voltage. Alternatively, cells or batteries may be combined in series to form series subunits exhibiting the desired overall voltage and then various series subunits may be connected in parallel to obtain the desired overall capacity.

Most battery system vendors and manufacturers assembling prismatic cells currently ultrasonically weld cell terminals of the individual prismatic cells together to create the desired electrical configuration of cells to generate a battery having the desired requirements. The number of cells to be welded together in parallel is limited by the length of the cell terminal. If the number of cells to be ultrasonically welded together exceeds the number of cells that can have their terminals ultrasonically welded together, power buss jumpers are ultrasonically welded, fastened, or wired together to series connect the paralleled cells into a module or pack. Traditional joining methods such as welding or soldering are avoided in these prior manufacturing and assembly methods because those methods generate heat that is transferred into the cell which could potentially damage the electrodes and packaging seals of the prismatic cells. These methods of manufacturing are time and labor intensive and are not manufacturing friendly, Additionally, it is difficult to maintain quality control utilizing these prior methods of manufacturing.

Since the performance of a battery or cell is adversely affected by temperature differences, battery packs are often manufactured with temperature regulating devices associated therewith. For example, battery packs may include heatsinks disposed between one or more of the cells or battery subunits of the battery pack. Examples of battery packs constructed with heatsinks disposed between various cells or battery subunits are described in U.S. Pat. No. 7,531,270 and U.S. patent application Ser. No. 12/103,830 and International Application Nos. PCT/US2008/013451 and PCT/US2008/012545. U.S. Pat. No. 7,531,270 and U.S. patent application Ser. No. 12/103,830 and International Application Nos. PCT/US2008/013451 and PCT/US2008/012545 are owned by the assignee of the present application. The disclosures of U.S. Pat. No. 7,531,270 and U.S. patent application Ser. No. 12/103,830 and International Application Nos, PCT/US2008/013451 and PCT/US2008/012545 are incorporated herein.

Due to the characteristics of the lithium ion batteries, the battery pack operates within an ambient temperature range of −20° C. to 60° C. However, even when operating within this temperature range, the battery pack may begin to lose its capacity or ability to charge or discharge should the ambient temperature fall below 0° C. Depending on the ambient temperature, the life cycle capacity or charge/discharge capability of the battery may be greatly reduced as the temperature strays from 0° C. Nonetheless, it may be unavoidable that the lithium ion battery be used where the ambient temperature falls outside the temperature range.

Alluding to the above, significant temperature variances can occur from one cell to the next, which is detrimental to performance of the battery pack. To promote long life of the entire battery pack, the cells must be below a desired threshold temperature. To promote pack performance, the differential temperature between the cells in the battery pack should be minimized. However, depending on the thermal path to ambient, different cells will reach different temperatures. Further, for the same reasons, different cells reach different temperatures during the charging process. Accordingly, if one cell is at an increased temperature with respect to the other cells, its charge or discharge efficiency will be different, and, therefore, it may charge or discharge faster than the other cells. This will lead to decline in the performance and life of the entire pack.

The art is replete with various designs of the battery packs with cooling systems, including U.S. Pat. No. 5,071,652 to Jones et al., U.S. Pat. No. 5,354,630 to Earl et al., U.S. Pat. No. 6,117,584 to Hoffman et al., U.S. Pat. No. 6,709,783 to Ogata et al., U.S. Pat. No. 6,821,671 to Hinton et al., and Japanese publication No. JP2001-229897.

Therefore, there remains an opportunity to improve upon the packs of lithium batteries of the prior art to increase the ambient temperature range at which the lithium battery operates and to provide a new scalable battery pack with improved packaging characteristics.

Also, there remains an opportunity to maintain the scalable battery pack at the optimal operating temperature to ensure the longest possible life cycle, rated capacity, and nominal charge and discharge rates.

The disclosed scalable battery module is a battery cell interconnect system to provide scalable electrical configurations in the assembly of multiple electrochemical cells within a battery module or battery pack. This electrical configurability allows a plurality of battery cells to be assembled into an electrical series string, or an electrical parallel string, or any multiples there between. The disclosed battery module or pack is adaptable to be utilized in various electrical configurations including and not limited to the overlapping of positive terminals and negative terminals of prismatic electrochemical battery cells. Electrical conductive power bussing straps or jumper tabs are mechanically assembled onto the overlapping cell terminals to create the appropriate series/parallel configuration. The battery module has a plurality of battery cells and heatsink assemblies with the cells disposed therebetween. A plurality of rods extend through the heatsink assemblies to secure the heatsink assemblies and the cells together with one another to form the battery module or battery pack.

According to one aspect of the disclosure, a scalable battery module includes a plurality of similarly configured cell groupings, a plurality of framed heatsink assemblies, and a plurality of jumper tabs. Each cell grouping includes a plurality of cell packs electrically coupled in parallel including a negative terminal and a positive terminal. Each plurality of framed heatsink assemblies is disposed between one cell pack of the plurality of cell packs of each cell groupings and an adjacent cell pack of the plurality of cell packs of each cell grouping and includes a thermally conductive sheet portion. Each of the plurality of jumper tabs electrically couples a negative terminal of one of the plurality of cell groupings to a positive terminal of an adjacent cell grouping.

According to another aspect of the disclosure, a scalable battery module includes a plurality of similarly configured cell groupings, a plurality of framed heatsink assemblies and a plurality of jumper tabs. Each of the plurality of similarly configured cell groupings includes a plurality of lithium ion prismatic cell packs electrically coupled in parallel. Each lithium ion prismatic cell pack includes oppositely facing large area surfaces having oppositely facing first and second edges with a positive terminal extending beyond the first edge of the oppositely facing large area surfaces and a negative terminal extending beyond the second edge of the oppositely facing large area surfaces. The positive terminal includes a positive coupling surface extending laterally from the oppositely facing large area surfaces and has at least one opening formed in a distal edge of the coupling surface and the negative terminal includes a negative coupling surface extending laterally from the oppositely facing large area surfaces and has at least one opening formed in a distal edge of the coupling surface. The plurality of framed heatsink assemblies each have a thermally conductive sheet portion framed by a frame portion formed to include jumper tab capture features and coupling surface capture features including at least one threaded stud formed on opposite sides of the frame portion. Each of the plurality of framed heat sink assemblies is disposed between one cell pack of the plurality of cell packs of each cell groupings and an adjacent cell pack of the plurality of cell packs of each cell grouping with the opening formed in the distal edge of the negative coupling surface of the one cell pack and the opening formed in the distal edge of the negative coupling surface of the adjacent cell pack combining to surround portions of the at least one threaded stud on one side of the frame portion and with the opening formed in the distal edge of the positive coupling surface of the one cell pack and the opening formed in the distal edge of the positive coupling surface of the adjacent cell pack combining to surround portions of the at least one threaded stud on the opposite side of the frame portion. Each of the plurality of jumper tabs is formed to include a plurality of stud-receiving holes each receiving a threaded stud therein with at least one of the stud-receiving holes receiving a threaded stud with portions surrounded by cooperating openings in the distal edges of coupling surfaces. Each of the plurality of jumper tabs electrically couple a negative terminal of one of the plurality of cell groupings to a positive terminal of an adjacent cell grouping.

BRIEF DESCRIPTION OF THE DRAWINGS

Other advantages of the present invention will be readily appreciated as the same becomes better understood by reference to the following detailed description when considered in connection with the accompanying drawings wherein:

FIGS. 1 through 18 illustrate various embodiments of the disclosed scalable battery module;

FIGS. 1 through 12 illustrate an even parallel (even P) battery module configuration and FIGS. 13 through 18 an odd parallel (odd P) battery module configuration;

FIG. 1 is a partially exploded perspective view of an even parallel (even P) battery module configuration of a scalable battery module showing side shields and an interim dual row clip exploded away from a battery sub-assembly module, FIG. 1 may also be viewed as illustrating steps in the method of forming a scalable battery module;

FIG. 2 is a partially exploded perspective view from a similar perspective to FIG. 1 of the battery-sub assembly module showing washer nuts, positive cell tab compression bars, negative cell tab compression bars, a non-terminal side assembly flex circuit and jumper tabs exploded away from the non-terminal side of the battery sub assembly module, FIG. 2 may also be viewed as illustrating steps preceding the steps shown in FIG. 1 in the method of forming a scalable battery module;

FIG. 3 is a partially exploded perspective view from an opposite perspective to FIGS. 1 and 2 of the battery-sub assembly module showing washer nuts, positive cell tab compression bars, negative cell tab compression bars, a terminal side assembly flex circuit and jumper tabs exploded away from the terminal side of a battery sub assembly, FIG. 3 may also be viewed as illustrating steps preceding the steps shown in FIG. 2 in the method of forming a scalable battery module;

FIG. 4 is a partially exploded view of the battery sub assembly of FIG. 3 showing a plurality of framed heatsink protected parallel cells assemblies, a positive terminal endplate, a negative terminal endplate, foam elements, tie rods and nuts, FIG. 4 may also be viewed as illustrating steps preceding the steps shown in FIG. 3 in the method of forming a scalable battery module;

FIG. 5 is a partially exploded view of one of the plurality of framed heatsink protected parallel cells assemblies of FIG. 4 showing a framed heatsink assembly 50, two cell packs, a first cell frame, and a second cell frame, FIG. 5 may also be viewed as illustrating steps preceding the steps shown in FIG. 4 in the method of forming a scalable battery module that are repeated as many times as necessary to form the required number of framed heatsink protected parallel cells assemblies to be utilized in the scalable battery module;

FIG. 6 is a perspective view of the assembled framed heatsink protected parallel cells assembly of FIG. 5;

FIG. 7 is a view of the portion of the assembled framed heatsink protected parallel cells assembly shown in circle 7 of FIG. 6;

FIG. 8 is a perspective view of a partially assembled even parallel (even P) battery module configuration of a scalable battery module showing tape holding jumper tabs received on the positive and negative studs of the various framed heatsink protected parallel cells assemblies securely in position on the terminal side of the battery sub-assembly module, FIG. 8 may also be viewed as illustrating interim steps performed in performing the steps shown in FIG. 3;

FIG. 9 is a perspective view of a partially assembled even parallel (even P) battery module configuration of a scalable battery module following the performance of the steps illustrated in FIGS. 3 and 8;

FIG. 10 is a perspective view of a partially assembled even parallel (even P) battery module configuration of a scalable battery module showing tape holding jumper tabs received on the positive and negative studs of the various framed heatsink protected parallel cells assemblies securely in position on the non-terminal side of the battery sub-assembly module, FIG. 10 may also be viewed as illustrating interim steps performed in performing the steps shown in FIG. 2;

FIG. 11 is a perspective view of an assembled even parallel (even P) battery module configuration of a scalable battery;

FIG. 12 is a diagrammatic view of the series/parallel connection between framed heatsink protected parallel cells assemblies of the even parallel (even P) battery module configuration of a scalable battery module showing jumper tabs coupling the positive and negative studs and terminals of the various framed heatsink protected parallel cells assemblies on both sides of the even parallel (even P) battery module configuration;

FIG. 13 is a partially exploded view of an odd parallel (odd P) battery module configuration of a scalable battery module showing a side shield, a plurality of nuts, a plurality of compression bars, a first side long flex circuit, first side short flex circuit exploded away from a battery sub-assembly having a plurality of jumper tabs attached thereto, FIG. 13 may also be viewed as illustrating steps in the method of forming a scalable battery module;

FIG. 14 is a partially exploded view of the opposite side of the odd P battery module configuration of a scalable battery module of FIG. 13 showing a side shield, a plurality of nuts, a plurality of compression bars, a second side long flex circuit, a second side short flex circuit exploded away from a battery sub-assembly having a plurality of jumper tabs and two end jumper tabs attached thereto, FIG. 14 may also be viewed as illustrating steps preceding the steps shown in FIG. 13 in the method of forming a scalable battery module;

FIG. 15 is a partially exploded view of an odd parallel (odd P) battery module configuration of a scalable battery module showing a side shield, a plurality of nuts, a plurality of compression bars, a first side long flex circuit, first side short flex circuit and jumper tabs exploded away from a battery sub-assembly, FIG. 15 may also be viewed as illustrating steps in the method of forming a scalable battery module including a step not shown as being performed in FIG. 13;

FIG. 16 is a partially exploded view of the opposite side of the odd P battery module configuration of a scalable battery module of FIG. 14 showing a side shield, a plurality of nuts, a plurality of compression bars, a second side long flex circuit, a second side short flex circuit, a plurality of jumper tabs and two end module jumper tabs exploded away from a battery sub-assembly, FIG. 16 may also be viewed as illustrating steps in the method of forming a scalable battery module including steps not shown as being performed in FIG. 14;

FIG. 17 is a partially exploded view of the battery sub assembly of FIGS. 13-16 showing a plurality of framed heatsink assemblies, a plurality of cell packs, a positive endplate, a negative endplate, foam elements, tie rods and nuts, FIG. 17 may also be viewed as illustrating steps preceding the steps shown in FIG. 16 in the method of forming a scalable battery module; and, FIG. 18 is a diagrammatic view of the series/parallel connection between cell packs sandwiching framed heatsink assemblies therebetween of the odd parallel (odd P) battery module configuration of a scalable battery module showing jumper tabs coupling the positive and negative terminals of the various cell packs.

DETAILED DESCRIPTION

Figure 1:
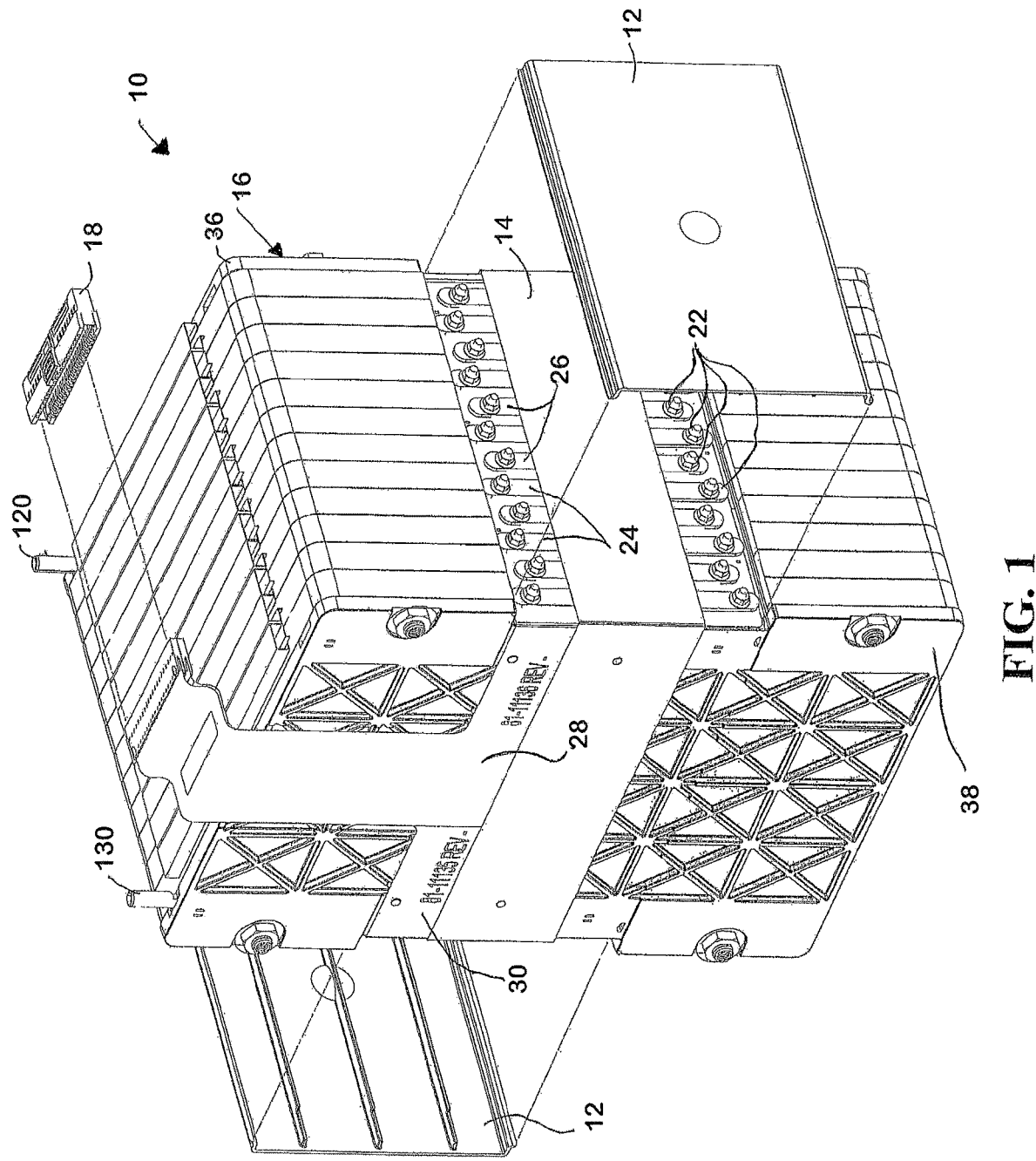

Referring to the Figures, wherein like numerals indicate like or corresponding parts, a battery unit or pack of the present invention is adaptable to be utilized in various configurations including and not limited to a horizontally or vertically stacked battery cell packaging configuration used in an automotive vehicle applications.

Referring to FIGS. 1-12, an even P embodiment of a battery module 10 of a battery pack is illustrated. Those of ordinary skill in the art will recognize that a battery pack can be formed by electrically coupling multiple battery modules 10 in series, parallel or series/parallel combinations. The battery module 10 includes two side shields 12, tape filament 14, a battery sub-assembly module 16 and an interim dual row 2.54 clip 18. As shown, for example, in FIGS. 1-3, the battery sub-assembly module 16 includes battery sub-assembly 20, a plurality of washer nuts 22, a plurality of positive stud cell tab compression bars 24, a plurality of negative cell tab compression bars 26, a non-terminal side assembly flex circuit 28, a terminal side assembly flex circuit 30, and a plurality of jumper tabs 32.

The tape filament 14 is wrapped around the battery sub-assembly module 16 with portions covering portions of the plurality of positive stud cell tab compression bars 24, the plurality of negative cell tab compression bars 26, the non-terminal side assembly flex circuit 28, the terminal side assembly flex circuit 30, and the plurality of jumper tabs 32 of the battery sub-assembly module 16, as shown, for example, in FIG. 1. The two side shields 12 are positioned on opposite sides of the battery sub-assembly module 16. The two side shields 12 are received in the molded relief features 116 of the plurality of framed heatsink protected parallel cells assemblies 34 to cover the plurality of positive cell tab compression bars 24, the plurality of negative cell tab compression bars 26, portions of the non-terminal side flexible circuit 28, portions of the terminal side flexible circuit 30, the plurality of jumper tabs 32 of the battery sub-assembly module 16 and portions of the tape filament 14 is wrapped around the battery sub-assembly module 16, as shown, for example, in FIG. 1.

Figure 2:
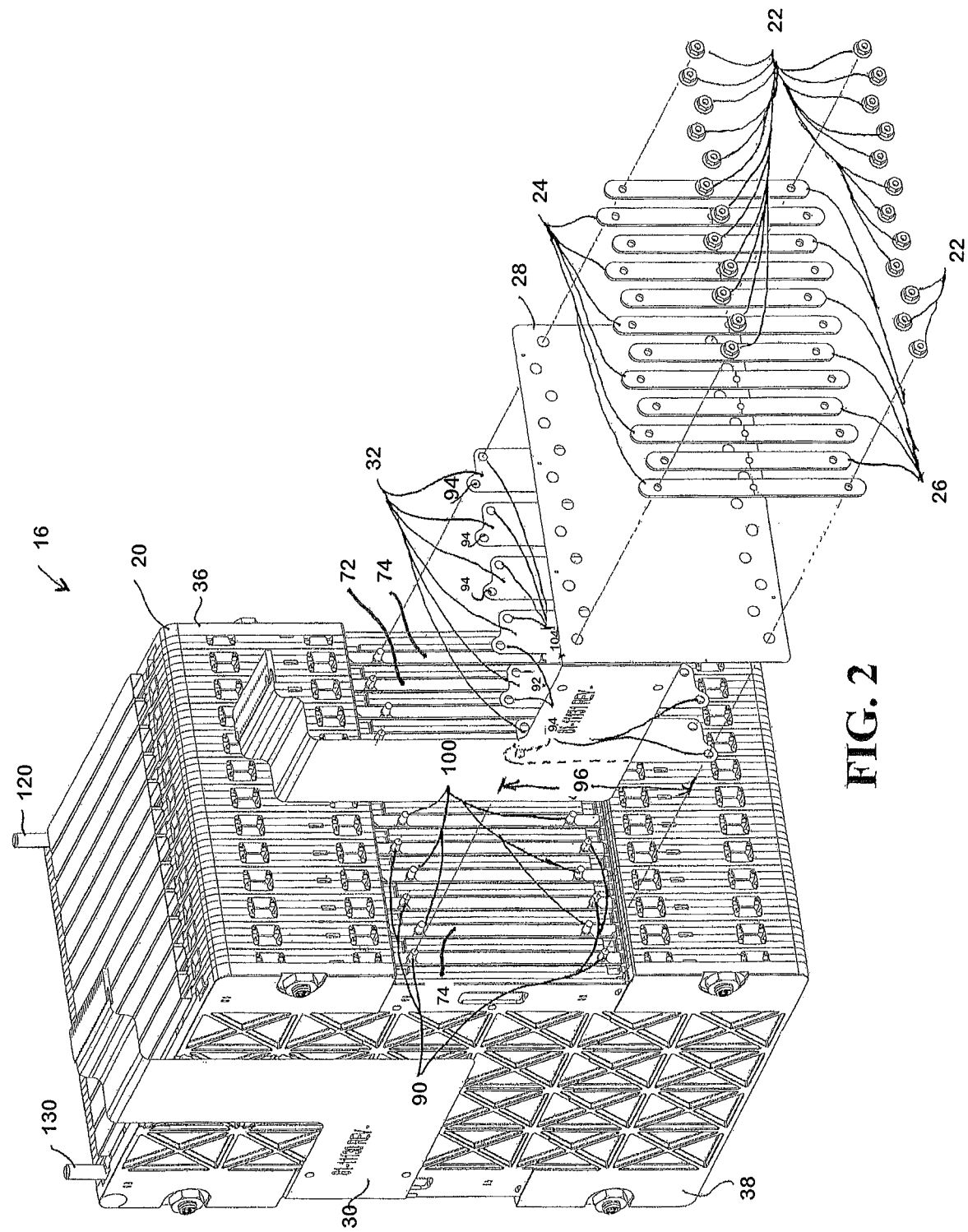
Figure 3:
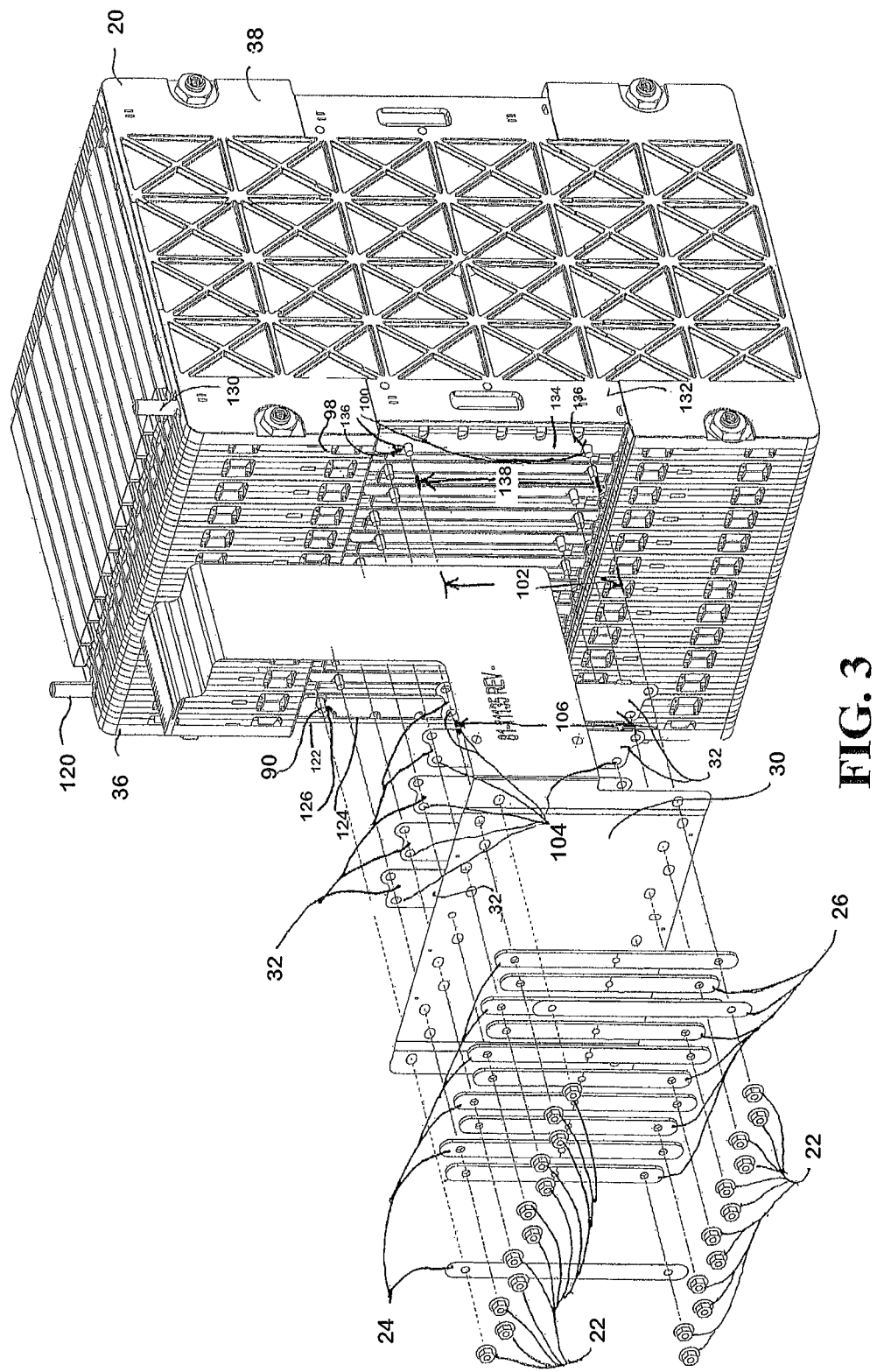

As shown, for example, in FIGS. 1-3, the plurality of positive cell tab compression bars 24 having a crowned or bowed configuration are connected to the frames to apply uniform pressure across the positive terminal coupling surfaces 68 of the parallel coupled cell packs 52 interconnected with one another and to the jumper tabs 32 and to secure the flexible circuits 28 and 30 which are attached about both sides of the module 10. The plurality of negative cell tab compression bars 26 having a crowned or bowed configuration are connected to the frames to apply uniform pressure across the negative terminal coupling surfaces 74 of parallel coupled cell packs 52 interconnected with one another and to the jumper tabs 32 and to secure the flexible circuits 28 and 30 which are attached about both sides of the module 10. This attachment is accomplished by screwing nuts 22 onto threaded studs 90 and 100 of each framed heatsink protected parallel cells assembly 34, described below.

Figure 4:
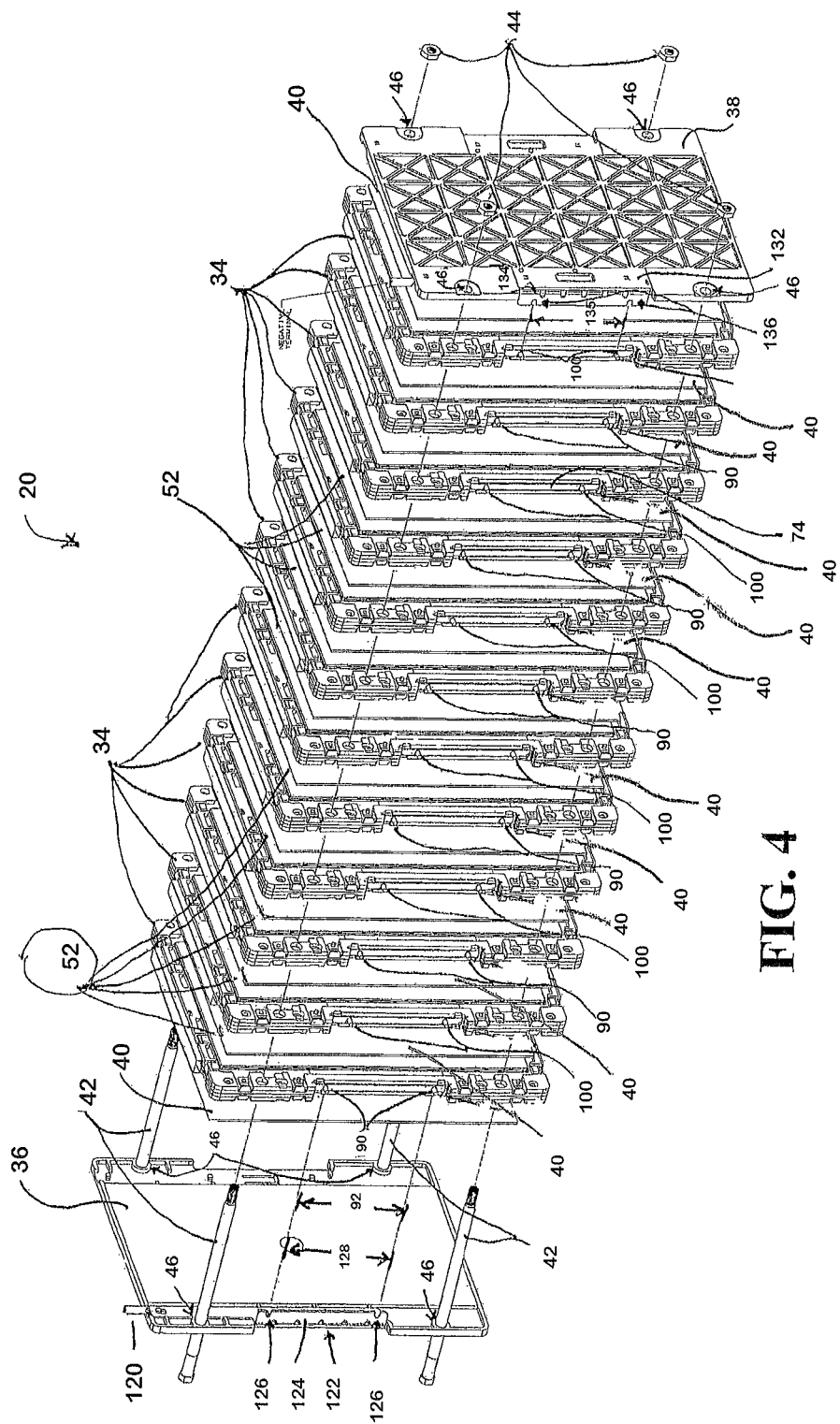
Figure 9:
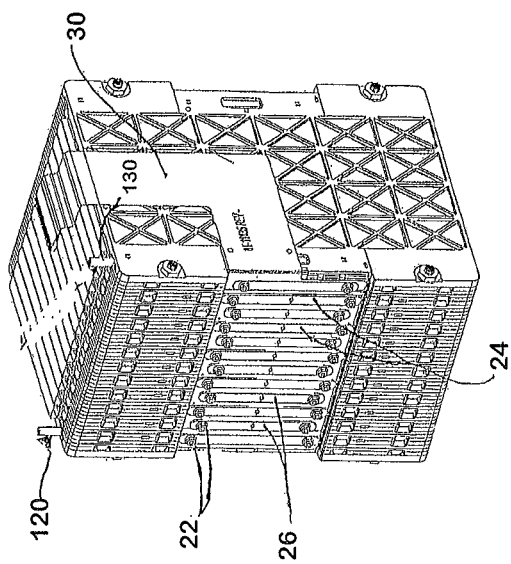
Figure 8:
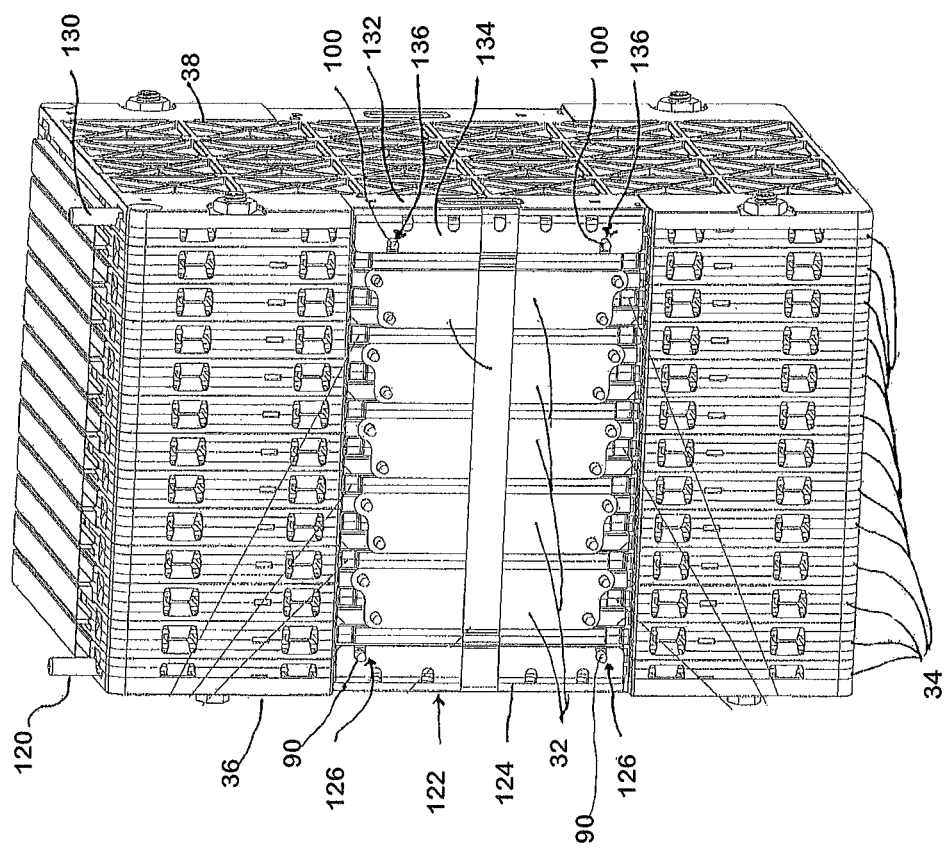
Figure 11:
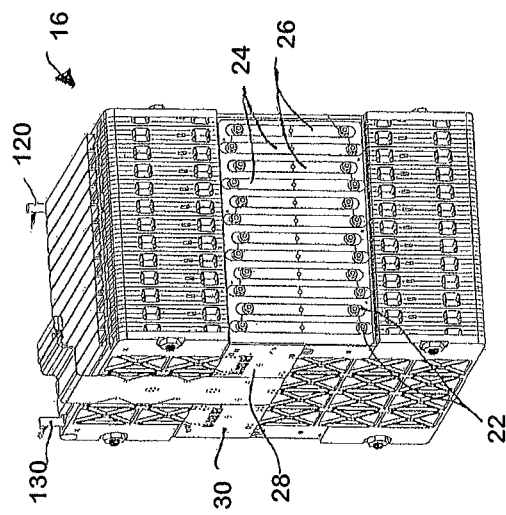
Figure 10:
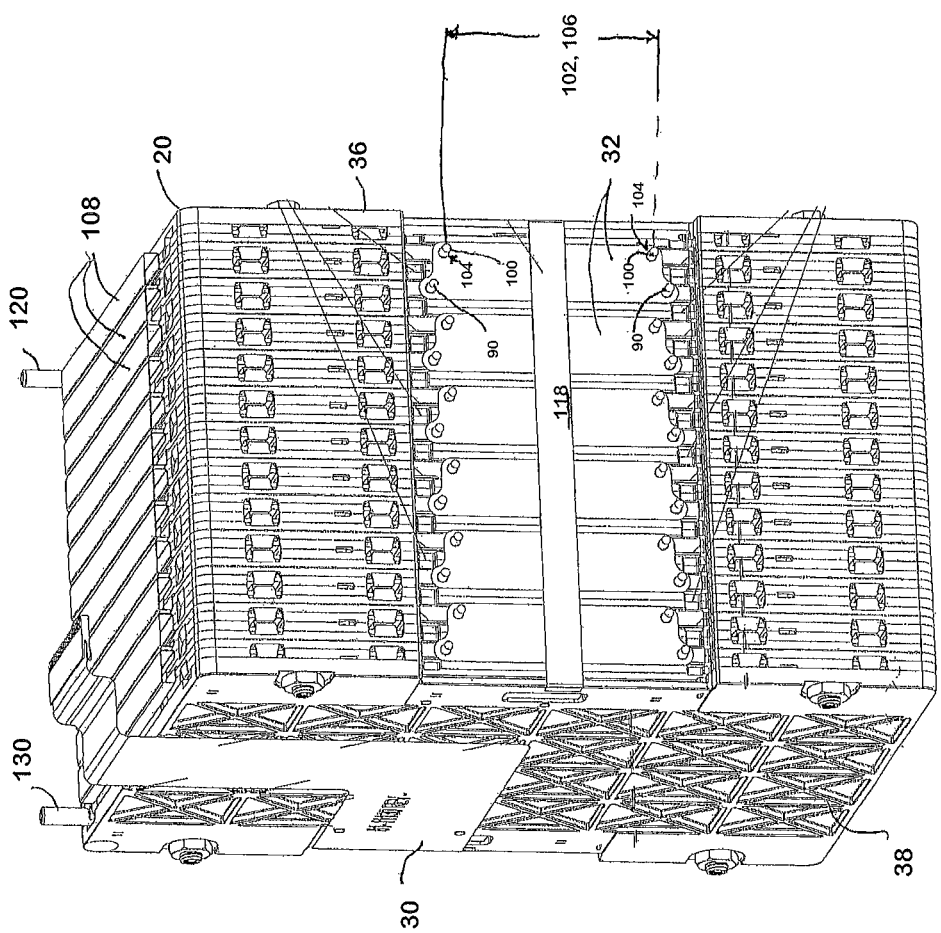

As best illustrated in FIG. 4, battery sub-assembly 20 includes a plurality of framed heatsink protected parallel cells assembly 34, a positive terminal endplate 36, a negative terminal endplate 38, a plurality of foam elements 40, four tie rods 42 and four nuts 44. In the illustrated embodiment, a foam element 40 is sandwiched between each framed heatsink protected parallel cells assembly 34 and between each end framed heatsink protected parallel cells assembly 34 and the positive terminal endplate 36 and the negative terminal endplate 38, respectively. The four tie rods 42 are each passed through tie rod-receiving holes 46 formed in each of the plurality of frames 54, 58 and frame members 82, 84 of each framed heatsink protected parallel cells assembly 34 and endplates 36, 38 and a nut 44 is placed on the threaded end of each of the tie rods 42 to secure the components of the battery sub assembly together, as shown, for example, in FIG. 4.

As shown, for example, in FIGS. 5-7, each framed heatsink protected parallel cells assembly 34 includes a framed heatsink assembly 50, first and second typical lithium battery cell packs 52, a first cell frame 54 and a second cell frame 58. Preferably, each cell pack 52 is a prismatic lithium ion cell without limiting the scope of the present invention. Those skilled in the battery art will appreciate that other cells can be utilized with the present invention. Each cell pack 52 includes a plurality of battery components (not shown) co-acting between one another with electrolyte therebetween as known to those skilled in the lithium battery art. A first electrode is adjacent a first current collector and a second electrode of charge opposite from the first electrode is adjacent a second current collector. A separator layer is positioned between the first and second electrodes with electrolyte disposed between the first and second electrodes to provide ion communication between the electrodes. A plurality of first electrodes and second electrodes are stacked and packaged into an electrical insulating envelope 56 to form a cell pack 52.

Referring to FIG. 5, two cell packs are shown each generally designated 52. FIG. 5 shows that the lithium battery cell pack includes an anode or negative terminal 70, a cathode or positive terminal 64, a packaging envelope 56, side seal edges 60, 62, first end seal edge 61, and second end seal edge 63. In the illustrated embodiment, the packaging envelope is made from two or more separate pieces of polymer coated aluminum foil and subsequently sealed on all four edges 60, 61, 62, 63. In an alternative embodiment, packaging envelope 56 is made from a single piece of polymer coated aluminum foil and is folded around the lithium battery cell at one edge 61, 63 the cell, and subsequently sealed to itself on side seal edges 60, 62 and the other edge 63, 61.

Alluding to the above, the cell pack 52 presents side edges 60 and 62. A positive terminal 64 extends from inside to beyond the side edge 60 of the envelope 56 of the cell pack 52. The positive terminal 64 is formed to include a bend 66 so that a positive terminal coupling surface 68 extends laterally to the plane of the envelope 56 beyond the edge 60 of the cell pack 52. In one embodiment, bend 66 defines an angle of approximately ninety degrees between the coupling surface 68 and the plane of the envelope 56 of the cell pack 52. A negative terminal 70 extends from inside to beyond the side edge 62 of the envelope 56 of the cell pack 52. The negative terminal 70 is formed to include a bend 72 so that a negative terminal coupling surface 74 extends laterally to the plane of the envelope 56 beyond the edge 62. In one embodiment, bend 72 defines an angle of approximately ninety degrees between the coupling surface 74 and the plane of the envelope 56 of the cell pack 52.

The distal edge of positive terminal coupling surface 68 presents a pair of semicircular openings 76 displaced on centers from one another by a first displacement 78. The distal edge of negative terminal coupling surface 74 presents a pair of semicircular openings (not clearly illustrated) displaced on centers from one another by a second displacement (not clearly shown). Second displacement differs from first displacement 78 to aid in proper assembly of the framed heatsink protected cells assembly 34. In the illustrated embodiment, first displacement is greater than second displacement, although those skilled in the art will recognize that second displacement may be greater than first displacement 78 within the scope of the disclosure. Alternatively, coupling surface 68, 74 may present other openings (not shown).

As best shown in FIGS. 4 and 5, the openings in the coupling surfaces 68, 74 of each of the positive and negative terminals 64, 70 are positioned symmetrically about the lateral centerline 80 of the cell pack 52. This symmetrical positioning of the openings allows the cell pack 52 to be rotated about the lateral centerline 80 to facilitate coupling the two cell pack 52 in a parallel electrical configuration to the framed heatsink assembly 50. By way of illustration, the upper and lower cell packs 52 shown in FIG. 5 are identically configured cell packs with the upper cell pack in a first orientation and the lower cell pack in a second orientation rotated 180 degrees about the lateral centerline 80 from the first orientation.

The first and second cell frames 54, 58 clamp the packaging envelopes 56 of the cell packs 52 around the perimeter to opposing sides of the framed heatsink assembly 50 to form the framed heatsink protected parallel cells assembly 34. If the packaging envelope 56 is of the folded type, the frames 54, 58 can clamp on the three seal edges of the packaging envelopes 56 and provide a concave feature on the fourth or bottom edge to cradle and protect the packaging envelope bottom edge. If the packaging envelope 56 is manufactured from two separate pieces and therefore sealed on all four edges 60, 61, 62, 63, the cell frames 54, 58 may be designed to clamp on all four seal edges 60, 16, 62, 63.

Each of the frame members 82, 84 has a positive side rail 88 formed to include a threaded stud 90 extending laterally therefrom. When frame members 82, 84 are joined together with heatsink 86 sandwiched therebetween, studs 90 are displaced on center from each other by a third displacement 92. Third displacement 92 is approximately equal to first displacement 78 so that studs 90 can act as a jumper tab/terminal coupling surfaces capture feature. When the top and bottom cell packs 52 are coupled to framed heatsink assembly 50, the studs 90 are received in the openings 76 of the positive terminal coupling surfaces 68 of the top and bottom cell packs 52 with the two positive terminal coupling surfaces overlapping so that the openings 76 formed in the distal edge of the positive terminal coupling surfaces of the top and bottom cell packs cooperating to surround a portion of the studs 90. Studs 90 are also received in positive stud receiving holes 94 of the jumper tabs 32. Stud receiving holes 94 are displaced from each other by a fifth displacement 96 (see FIG. 2) approximately equal to first displacement 78 and third displacement 92. Studs 90 hold a jumper tab 32 securely in place to facilitate mechanically and electrically connecting all of the terminals of two adjacent framed heatsink protected parallel cells assemblies 34 in series, in a configuration shown in more detail in FIG. 12. Each of the heat sink protected parallel cell assemblies 34 include a cell grouping 1251 (shown individually as 1251 a-l) and a framed heat sink assembly 50.

Each of the frame members 82, 84 has a negative side rail 98 formed to include a threaded stud 100 extending laterally therefrom. When frame members 82, 84 are joined together with heatsink 86 sandwiched therebetween, studs 100 are displaced on center from each other by a fourth displacement 102 (see FIG. 3). Fourth displacement 102 is approximately equal to second displacement so that studs 100 can act as a jumper tab/terminal coupling surfaces capture feature. When the top and bottom cell packs 52 are coupled to framed heatsink assembly 50, the studs 100 are received in the openings of the negative terminal coupling surfaces 74 of the top and bottom cell packs 52 with the two negative terminal coupling surfaces overlapping so that the openings formed in the distal edge of the negative terminal coupling surfaces of the top and bottom cell packs cooperating to surround a portion of the studs 100. Studs 100 are also received in negative stud-receiving holes 104 of the jumper tabs 32. Stud-receiving holes 104 are displaced from each other by a sixth displacement 106 approximately equal to second displacement and fourth displacement 102. Studs 100 hold a jumper tab 32 securely in place to facilitate mechanically and electrically connecting all of the terminals of two adjacent framed heatsink protected parallel cells assemblies 34 in series.

The studs 90, 100 molded into and extending from the frame members 82, 84 on a positive and a negative side of the framed heatsink assembly 50, respectively, act as terminal/jumper tab bar capture devices. Each side of the frame 82, 84 also has a molded relief feature 116 to provide positioning for a thermal sensor which may be included in the flexible circuits 28, 30.

The heatsink 86 includes top thermal transfer edge 108 and bottom thermal transfer edge 110. The top and bottom thermal transfer edges 108, 110 may include a plurality of fins integral with and extending from the heatsink 86. The fins may be cold formed and are designed to transfer heat either to or from the cells depending on application. The frame members 82, 84 are mechanically attached on each side of the heatsink 86.

The positive terminals 64 of both cell packs 52 are folded over so that the openings 76 of the overlapping positive terminal coupling surfaces 68 cooperate to surround the positive studs 90 formed in the positive side rail 88 of the framed heatsink 50 (as shown, for example, in FIG. 7) and the negative terminals 70 of both cell packs 52 are folded over so that the openings of the overlapping negative terminal coupling surfaces 74 cooperate to surround the negative studs 100 formed in the negative side rail 98 of the framed heatsink 50 so that the two cell packs in each framed heatsink protected parallel cells assembly 34 are coupled in an electrical parallel configuration, During assembly jumper tabs 32 are positioned and secured onto the studs 90, 100 of two adjacent framed heatsink protected parallel cells assemblies 34 with stud 90 being received in positive stud-receiving holes 94 and negative studs 100 being received in negative stud-receiving holes 104 to couple the parallel coupled cell packs 52 of the adjacent framed heatsink protected parallel cells assemblies 34 in series. As shown, for example, in FIGS. 2, 3, 8 and 10, the centerlines between positive stud-receiving holes 94 and negative stud-receiving holes 104 is approximately equal to the thickness of each framed heatsink protected parallel cells assemblies 34 so that the holes 94, 104 are appropriately positioned to receive appropriate studs 90, 100. The overall length of jumper tab 32 is greater than the displacement 92 between positive studs, but less than the width of the molded relief features 116 of the frame member 82, 84 of the framed heatsink protected parallel cells assemblies 34, The overall width of each jumper tab, in the illustrated embodiment, is less than twice the thickness of a heatsink protected parallel cells assembly 34. Jumper tabs are formed of appropriate conductive material to form an electrical connection between the various terminals of the cell packs 52 of the framed heatsink protected parallel cells assemblies 34 to which they are attached. In one embodiment of the disclosed scalable battery module and method of assembling the same, the positive and negative terminals of each cell pack assembly and the jumper tabs are plated in a common plating process to reduce the potential seen in different metals to decrease impedance due to galvanic corrosion over long periods of time.

As shown in FIGS. 1-4 and 8-12, the process of positioning and securing jumper tabs 32 onto the studs 90, 100 of two adjacent framed heatsink protected parallel cells assemblies 34 to couple the parallel coupled cell packs 52 of the adjacent framed heatsink protected parallel cells assemblies 34 in series is continued until a battery sub-assembly module 16 having the desired overall voltage and capacity is formed. As shown, for example, in FIGS. 8 and 10, tape 118 may be utilized to hold the jumper tabs 32 on the battery sub-assembly 20 until other components and nuts 22 are attached to the studs 90, 100.

Frames 54, 58 and frame members 82, 84 are preferably plastic frames, such as from readily moldable plastics. An exemplary readily moldable plastic that is relatively inexpensive and structurally sufficient is valox but not limited to elyte resistant. If there is a requirement for a fire resistant plastic, a plastic having intumescent properties is preferably used, such as the elastomeric intumescent material disclosed in U.S. Pat. No. 6,809,129 to Abu-Isa. In another aspect of the present invention, the two frame members 82, 84 may be identical, thereby being manufacturable from a single mold cavity. In another aspect of the present invention, the two frames 54, 58 may be identical, thereby being manufacturable from a single mold cavity.

As shown for example, in FIGS. 5-7, in the one embodiment of the disclosed scalable battery module, the cell frames 54, 58 have a pin and socket configuration on the side facing away from the clamping surfaces in order to mate and align with one or more framed heatsink protected parallel cells assemblies 34.

FIGS. 5-7 provide a detailed explanation of the mechanical connection defined between the framed heatsink assembly 50, the first cell frame 54 and the second cell frame 58 for securing the cell packs 52 sandwiching framed heatsink assembly 50 therebetween and between the first and second frame members 82, 84 sandwiching the heatsink 86 therebetween. The frames 54, 58 and frame members 82, 84 present a mechanical connection therebetween presented in the shape of snap towers, hooks and other mechanical devices without limiting the scope of the present invention. Mechanical connection between the cell packs 52 and the framed heatsink assembly 50 is generally shown in FIGS. 5 and 7. Additional descriptions of mechanisms and structures formed on cell frames and framed heatsink assembly frame members are described in co-owned International Application Nos. PCT/US2008/013451 and PCT/US2008/012545 the disclosures of which are incorporated herein by this reference.

Figure 12:
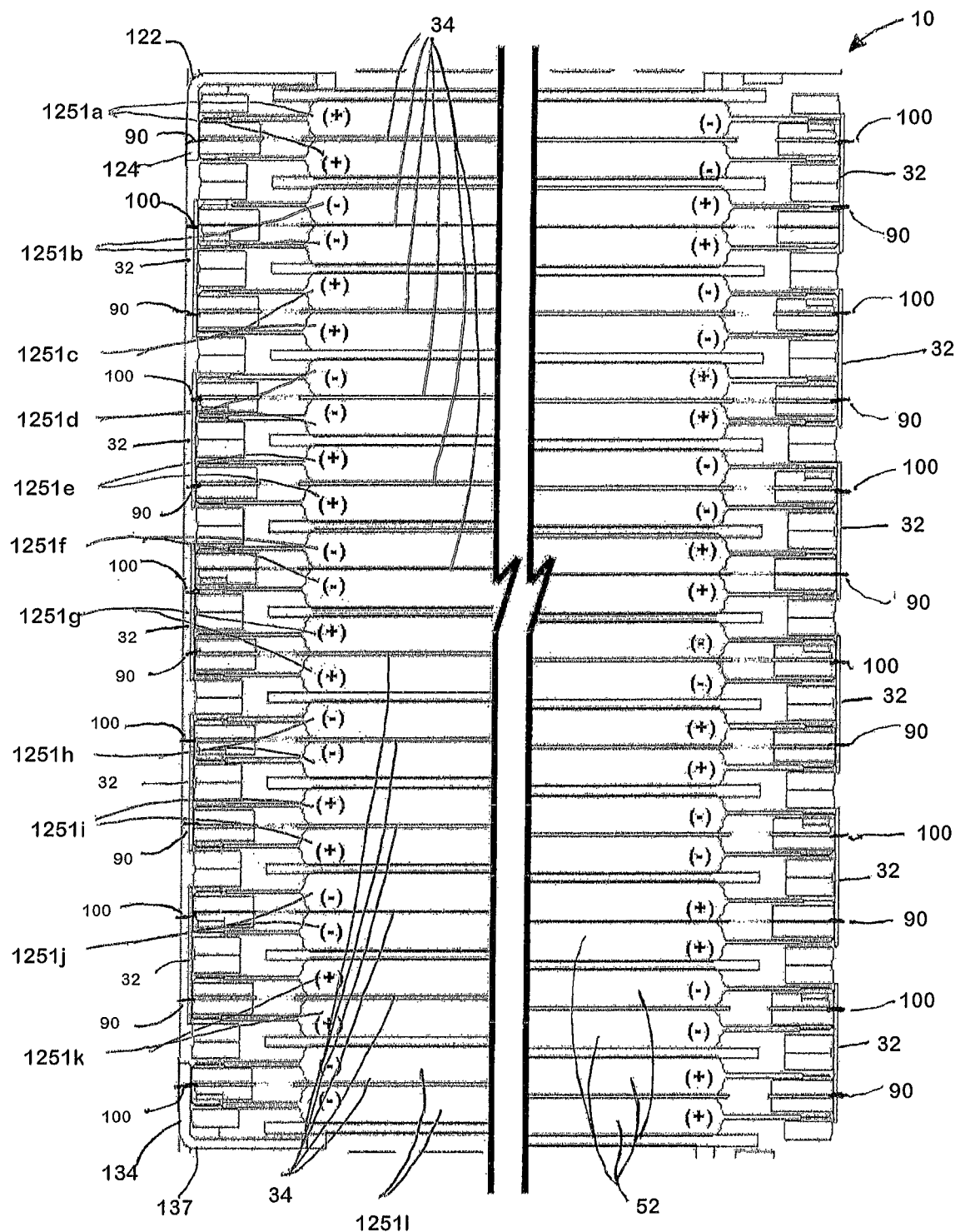
Figure 13:
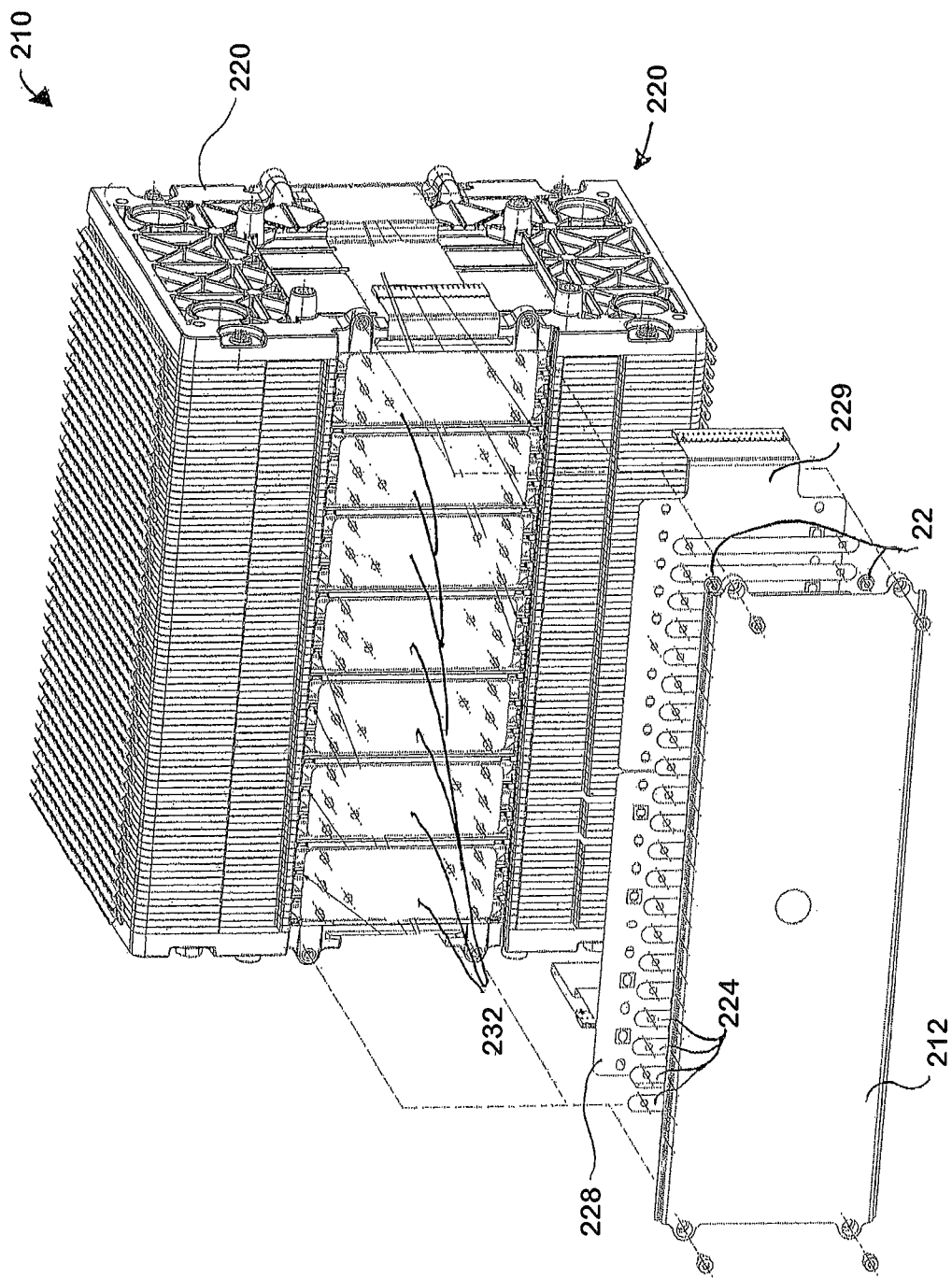
Figure 14:
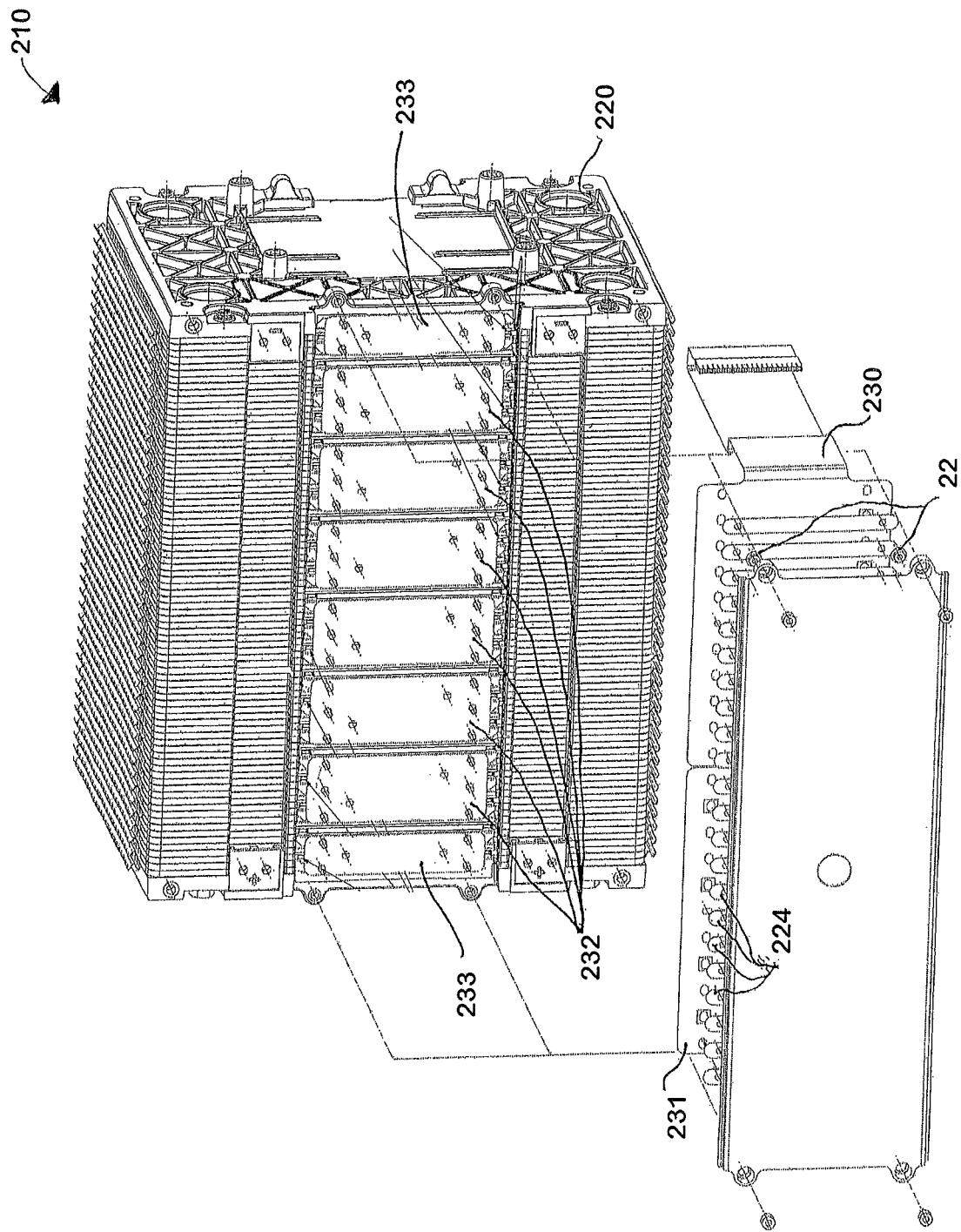

As the illustrated even P battery module 10 is being assembled, the framed heatsink protected parallel cells assemblies 34 are oriented in such a fashion wherein the adjacent framed heatsink protected parallel cells assemblies 34 are oriented in alternating fashion, as shown for example, particularly in FIGS. 4 and 12 and generally in FIGS. 1-3 and 8-11. In one embodiment, the orientation achieved in FIGS. 1-12 is accomplished by providing a plurality of identically configured framed heatsink protected parallel cells assemblies 34 and rotating every other framed heatsink protected parallel cells assembly 34 180 degrees about its longitudinal access so that adjacent framed heatsink protected parallel cells assemblies 34 have oppositely charged terminals on the same side of the battery module 10.

The disclosed Even P battery module 10 is adaptable to provide scalable electrical configurations. battery module 10 is configured to permit multiple even P battery modules to be coupled together to form a battery pack including one or more battery modules each presenting a multitude of prismatic cell packs each having at least one large area surface in contact with a heatsink formed from thermally conductive materials such as, for example, flat stock aluminum alloy foils and the like, without limiting the scope of the present invention. This facilitates regulating the temperature of each cell pack fairly evenly across the entire battery module.

As best shown in FIGS. 1 and 5, the disclosed even P battery module 10 includes a plurality of heatsinks, generally shown at 86 in FIG. 5. Each heatsink 86 is formed from a thermally conductive material such as aluminum, copper, and the like, without limiting the scope of the present invention. Each heatsink 86 terminates to opposite fin portions or thermal edges, generally indicated at 108, 110 in FIG. 5. The fin portion 108,110 may include a gate shape, may be pleated, planar, may present a plurality of slots or holes, may be formed as a bend to provide a thermal interface plane for an external heating or cooling device including but not limited to heater blankets and/or cooling jackets.

Those skilled in the art will appreciate that numerous other shapes of the fin portions 108, 110 can be utilized to provide better surface area for cooling or heating media, such as liquids, solids, or gasses, and the like, are introduced to the fin portions 108, 110 of each thermally conductive plate, sheet, or foil to either cool or to heat the cell packs 52.

Positive terminal endplate 36 and negative terminal endplate 38 act as a pair of compression plates sandwiching the framed heatsink protected parallel cells assemblies 34 and foam elements 40 therebetween. The positive terminal endplate 36 is formed to include a top positive terminal 120 electrically coupled to a positive jumper 122 having a flange 124 extending perpendicular to the plane of the endplate 36 having semicircular openings 126 present in the distal end for partially encompassing the positive studs 90 of the framed heatsink protected parallel cells assembly 34 that is adjacent to the positive terminal endplate 36. The semicircular openings 126 in the flange 124 are displaced on center from each other by a seventh displacement 128 approximately equal to the third displacement 92 to facilitate capturing studs 90 within the openings 126. The negative terminal endplate 38 is formed to include a top negative terminal 130 electrically coupled to a negative jumper 132 having a flange 134 extending perpendicular to the plane of the endplate having semicircular openings 136 present in the distal end for partially encompassing the negative studs 100 of the framed heatsink protected parallel cells assembly 34 that is adjacent to the negative terminal endplate 38. The semicircular openings 136 in the flange 134 are displaced on center from each other by an eighth displacement 138 approximately equal to the fourth displacement 102 to facilitate capturing studs 100 within the openings 136. Cables may be coupled to the top positive terminals 120 and top negative terminals 130 of multiple scalable battery modules 10 in series, parallel or series parallel electrical configurations to create a battery pack.

The positive terminal endplate 36 and negative terminal endplate 38 are fastened together to provide additional compressive force to the framed heatsink protected parallel cells assemblies 34. In one embodiment, the tape filament acts as a compression strap. The compression strap wraps around the framed heatsink protected parallel cells assemblies 34 to apply compressive stress.

While only an even P battery module 10 having adjacent framed heatsink protected parallel cells assemblies 34 coupled in series by a jumper tab 32 having two positive stud-receiving holes 94 and two negative stud-receiving holes 104 is illustrated, it is within the contemplated scope of the disclosure for cell packs of two or more adjacent heatsink protected parallel cells assemblies 34 to be coupled in parallel to each other and in series to two or more heatsink protected parallel cells assemblies 34 utilizing an appropriately configured jumper tab and proper orientation of heatsink protected parallel cells assemblies 34 to form other configurations of even P battery modules 10.

Referring to FIGS. 13-18, an odd parallel (odd P) embodiment of a battery module 210 of a battery pack is illustrated. Those of ordinary skill in the art will recognize that a battery pack can be formed by electrically coupling multiple battery modules 210 in series, parallel or series/parallel combinations. The battery module 210 utilizes many components so similar to those used in the even P battery module 10 that some identical reference numerals will be utilized for slightly differing components with the differences being pointed out but with the remainder of the description not being repeated. Similar, but differing, components will be identified with reference numerals exactly 200 higher than those utilized in describing the even P embodiment.

Referring to FIGS. 13-16, the battery module 210 includes two side shields 212, a battery sub-assembly 220, a plurality of washer nuts 22, a plurality compression bars 224, a first side long flex circuit 228, a first side short flex circuit 229, a second side long flex circuit 230, a second side short flex circuit 231, a plurality of jumper tabs 232 and a pair of end module jumper tabs 233.

The two side shields 212 are positioned on opposite sides of the battery module 220. The two side shields 212 are received in the recess features 316 of the plurality of framed heatsink assemblies 250 to cover the plurality of tab compression bars 224, flexible circuit 228-231, the plurality of jumper tabs 232 and end module jumper tabs 233 of the battery sub-assembly 220, as shown, for example, in FIGS. 13 and 14.

As shown, for example, in FIGS. 13-16, the plurality of compression bars 224 having a crowned or bowed configuration are connected to the frames to apply uniform pressure across any underlying terminal coupling surfaces 268 of coupled cell packs 52 interconnected with one another and to the jumper tabs 232, 233 and to secure the flexible circuits 228-231 which are attached about both sides of the module 210. This attachment is accomplished by screwing nuts 22 onto threaded studs 290 of each framed heatsink assembly 250, described below.

Figure 17:
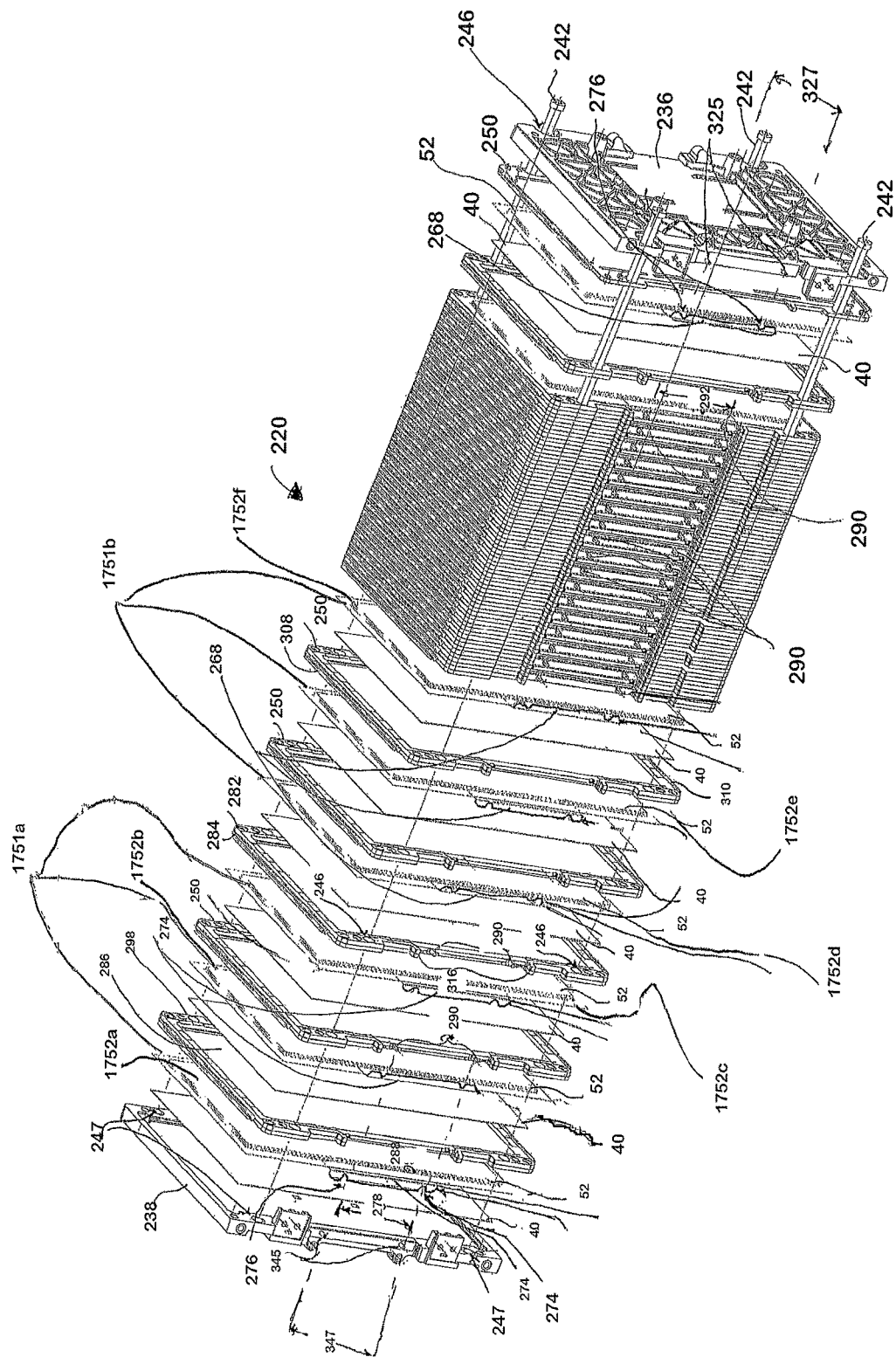

As best illustrated in FIG. 17, battery sub-assembly 220 includes a plurality of framed heatsink assembly 250, a plurality of cell packs 52, a positive endplate 236, a negative endplate 238, a plurality of foam elements 40 and four tie rods 242. In the illustrated embodiment, a foam element 40 is sandwiched between each framed heatsink assembly 250 and between each cell pack and an adjacent end framed heatsink assembly 250 or the negative terminal endplate 238, respectively. The four tie rods 242 are each passed through tie rod-receiving holes 246 formed in each of the plurality of frame members 282, 284 of each framed heatsink assembly 250 and positive endplate 236 and threaded into one of four threaded holes 247 in the negative endplate 238 to secure the components of the battery sub-assembly 220 together, as shown, for example, in FIG. 17.

Cell packs 52 of odd P battery module 210 are substantially similar to those described with regard to even P battery module 10 except that the semicircular openings 276 formed in the distal ends of the positive terminal coupling surface 268 and negative terminal coupling surface 274 are both displaced from each other by the same opening displacement 278.

The first frame member 282 of one framed heatsink assembly 250 and second frame member 284 of an adjacent framed heatsink assembly 250 clamp the packaging envelope 56 of the cell pack 52 sandwiched therebetween around the perimeter. If the packaging envelope 56 is of the folded type, the frame members 282, 284 can clamp on the three seal edges of the packaging envelopes 56 and provide a concave feature on the fourth or bottom edge to cradle and protect the packaging envelope bottom edge. If the packaging envelope 56 is manufactured from two separate pieces and therefore sealed on all four edges 60, 61, 62, 63, the frame members 282, 284 may be designed to clamp on all four seal edges 60, 61, 62, 63.

Each of the frame members 282, 284 has a first and second side rail 288, 298 formed to include a threaded stud 290 extending laterally therefrom. When frame members 282, 284 are joined together with heatsink 286 sandwiched therebetween, studs 290 are displaced on center from each other by a stud displacement 292. Stud displacement 292 is approximately equal to opening displacement 278 so that studs 290 can act as a jumper tab/terminal coupling surfaces capture feature. When the cell packs 52 are coupled between adjacent framed heatsink assemblies 250, the studs 290 are received in the openings 276 of the positive terminal coupling surfaces 268 or negative terminal coupling surfaces 274 of one or two adjacent cell packs 52, as shown, for example, in FIG. 17. Studs 290 are also received in stud-receiving holes 294 of the jumper tabs 232, 233. Stud-receiving holes 294 are displaced from each other by a hole displacement 296 (see FIG. 15) approximately equal to opening displacement 278 and stud displacement 292. Studs 290 hold a jumper tab 232, 233 securely in place to facilitate mechanically and electrically connecting all of the terminals in the desired series, parallel or series/parallel configuration.

The studs 290 molded into and extending from the frame members 282, 284 on a positive and a negative side of the framed heatsink assembly 250, respectively, act as terminal/jumper tab bar capture devices. Each side of the frame 282, 284 also has a molded relief feature 316 to provide positioning for a thermal sensor which may be included in the flexible circuits 228-231.

The heatsink 286 includes top thermal transfer edge 308 and bottom thermal transfer edge 310. The top and bottom thermal transfer edges 308, 310 may include a plurality of fins integral with and extending from the heatsink 286. The fins may be cold formed and are designed to transfer heat either to or from the cells depending on application. The frame members 282, 284 are mechanically attached on each side of the heatsink 286.

Frame members 282, 284 are preferably plastic frames, such as from readily moldable plastics. An exemplary readily moldable plastic that is relatively inexpensive and structurally sufficient is valox but not limited to elyte resistant. If there is a requirement for a fire resistant plastic, a plastic having intumescent properties is preferably used, such as the elastomeric intumescent material disclosed in U.S. Pat. No. 6,809,129 to Abu-Isa. In another aspect of the disclosed scalable battery module 210, the two frame members 282, 284 may be identical, thereby being manufacturable from a single mold cavity.

As shown for example, in FIG. 17, in the one embodiment of the disclosed scalable battery module 210, the frame members 282, 284 have a pin and socket configuration on the side facing away from the heat sink clamping surfaces in order to mate and align with one or more adjacent framed heatsink assemblies 250.

FIG. 17 provides a detailed explanation of the mechanical connection defined between the first and second frame members 282, 284 sandwiching the heatsink 286 therebetween. The frame members 282, 284 present a mechanical connection therebetween presented in the shape of snap towers, hooks and other mechanical devices without limiting the scope of the present invention. Additional descriptions of mechanisms and structures formed on frame members are described in co-owned International Application Nos. PCT/US2008/013451 and PCT/US2008/012545 the disclosures of which are incorporated herein by this reference.

Figure 18:
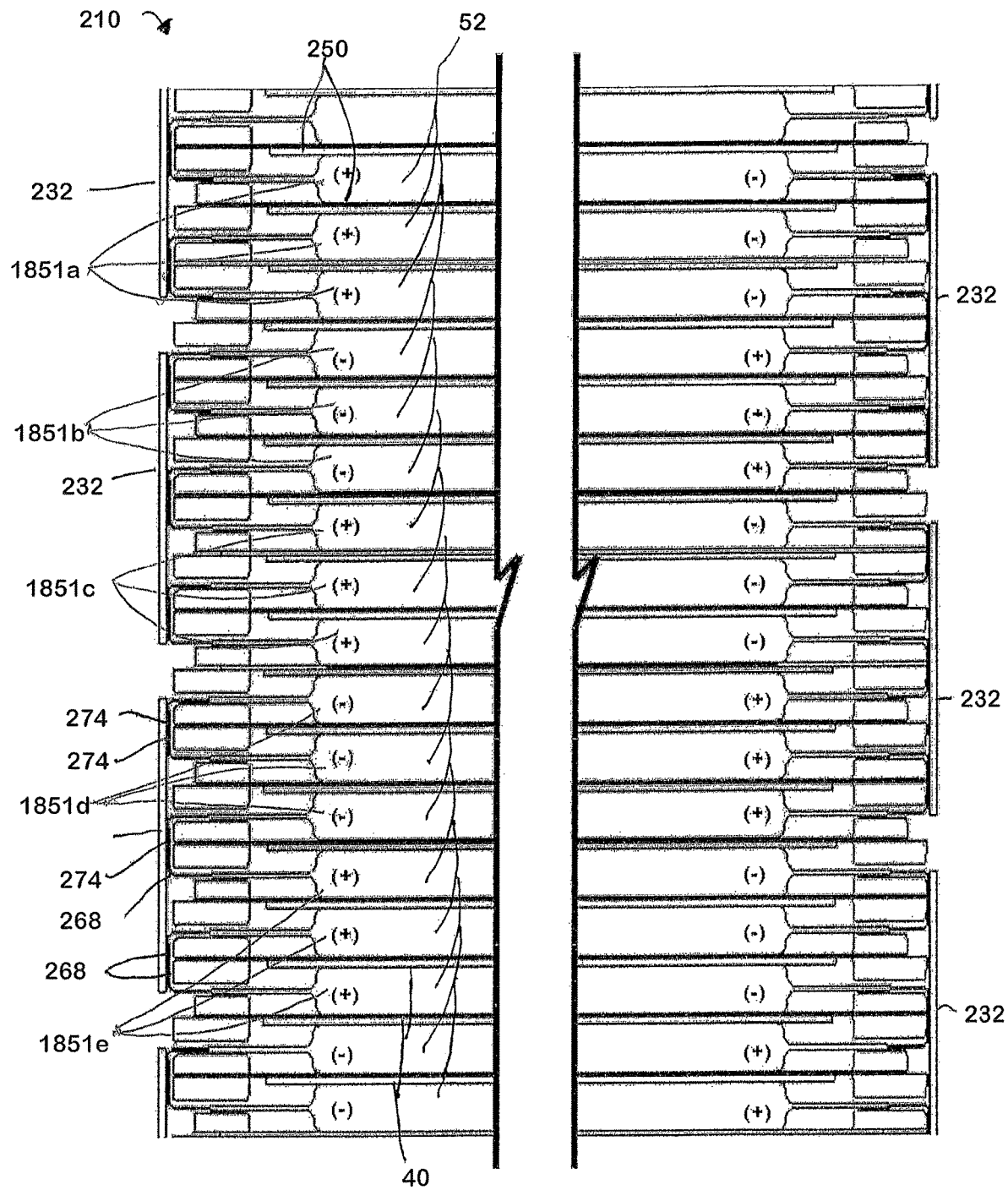

As the illustrated odd P battery module 210 is being assembled, the cell packs 52 are oriented to have the negative terminal couplings surfaces 274 and positive terminal coupling surfaces 268 oriented as shown in FIGS. 17 and 18.

As shown, for example, in FIGS. 13-16 and 18, during assembly jumper tabs 232 are positioned and secured onto the studs 290 of three sequentially ordered framed heatsink assemblies 250 with studs 290 being received in stud-receiving holes 294 to couple the three sequentially ordered parallel coupled cell packs 52 adjacent the framed heatsink assemblies 250 in series with the next three parallel coupled cell packs 52. As shown, for example, in FIGS. 14, 16 and 18, during assembly jumper tabs 233 are positioned and secured onto the studs 290 of the nearest famed heat sink assembly of three sequentially ordered framed heatsink assemblies 250 to an endplate with studs 325, 345 on the adjacent endplate 236, 238. The studs 290, 325, 345 are received in stud-receiving holes 294 to couple the three sequentially ordered parallel coupled cell packs 52 adjacent the framed heatsink assemblies 250 in series with the endplate 236, 238.

Figure 15:
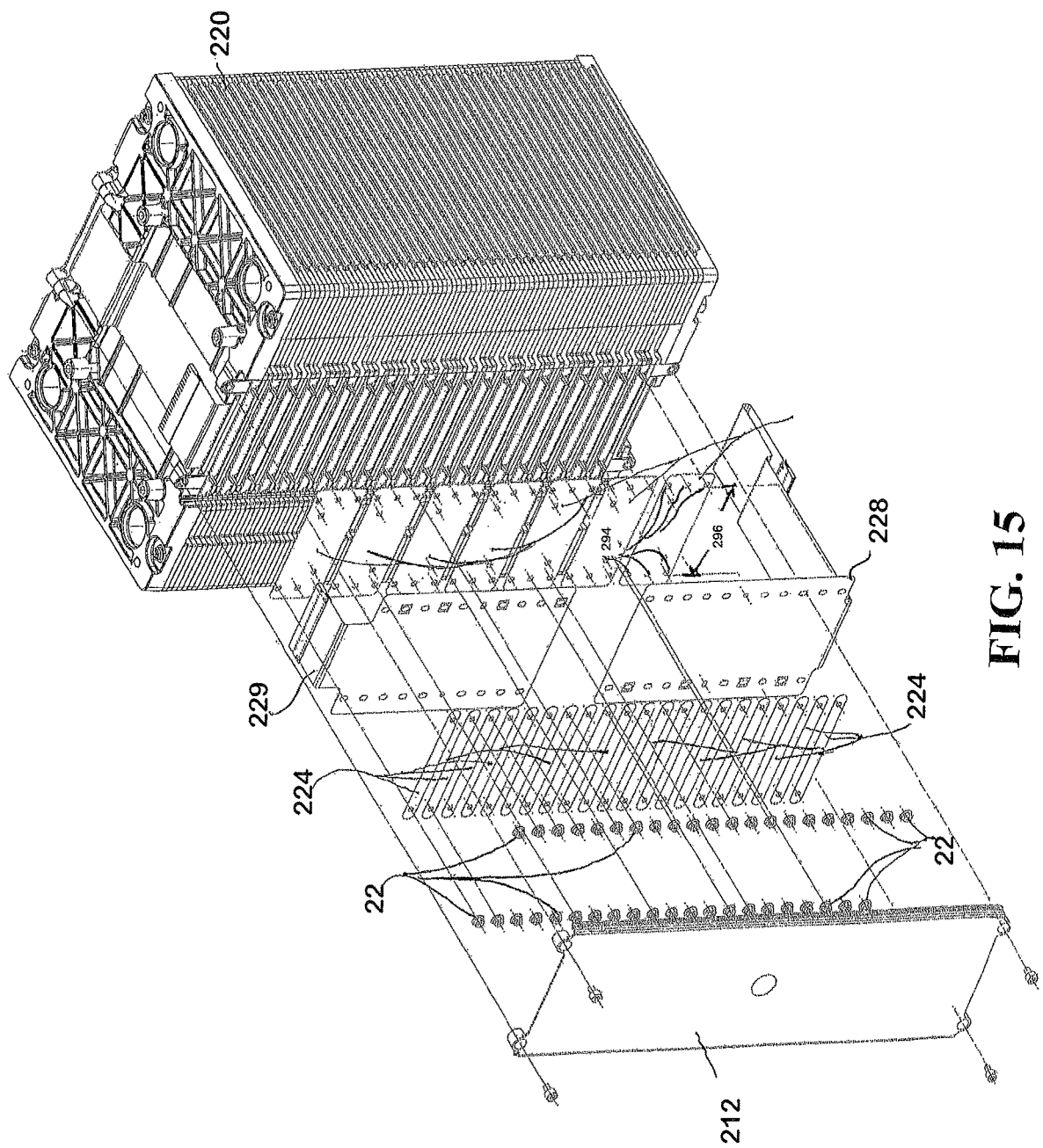
Figure 16:
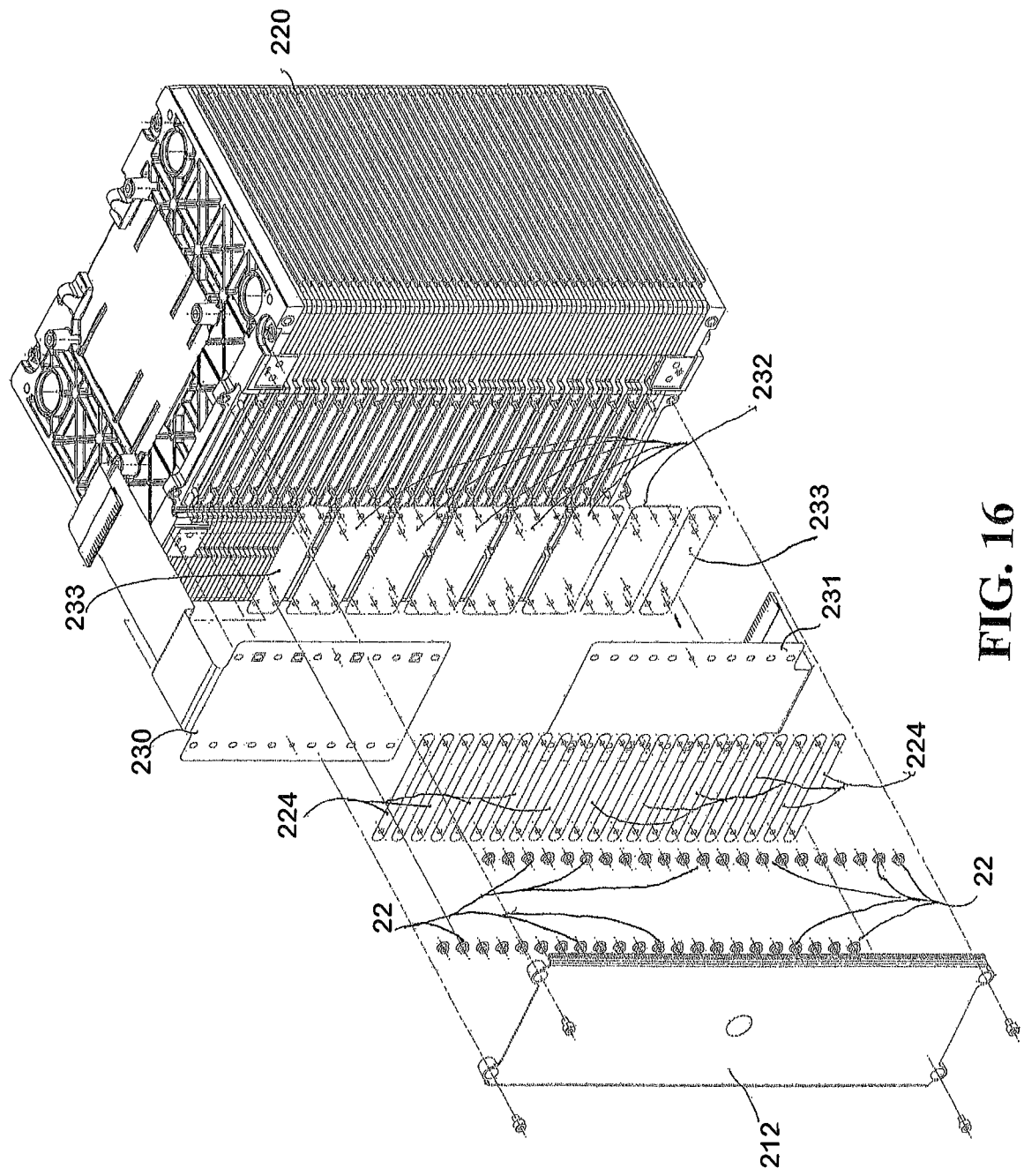

As shown, for example, in FIGS. 15 and 16, the centerlines between each pair of cooperating stud-receiving holes 294 and adjacent pairs of cooperating stud-receiving holes 294 is approximately equal to the thickness of each framed heatsink assembly 250 so that the holes 294 are appropriately positioned to receive appropriate studs 290. The overall length of jumper tab 232 is greater than the displacement 292 between studs 290, but less than the width of the molded relief features 316 of the frame member 282, 284 of the framed heatsink assemblies 250. The overall width of each jumper tab 232, in the illustrated embodiment, is less than three time the thickness of a heatsink assembly 250. Jumper tabs 232, 233 are formed of appropriate conductive material to form an electrical connection between the various terminals of the cell packs 52 sandwiched between the framed heatsink assemblies 250 to which they are attached.

The disclosed odd P battery module 210 is adaptable to provide scalable electrical configurations. Odd P battery module 210 is configured to permit multiple odd P battery modules to be coupled together to form a battery pack including one or more battery modules 210 each presenting a multitude of prismatic cell packs 52 each having at least one large area surface in contact with a heatsink 286 formed from thermally conductive materials such as, for example, flat stock aluminum alloy foils and the like, without limiting the scope of the present invention. In the illustrated embodiment, one large area surface of each cell pack 52 is in direct contiguous contact with a heatsink 286 and the other large area surface is in thermal conductive contact via a foam element with a heatsink 286 or the negative endplate 238. This facilitates regulating the temperature of each cell pack 52 fairly evenly across the entire battery module 210.

As best shown in FIGS. 13-17, the disclosed odd P battery module 210 includes a plurality of heatsinks 286 formed from a thermally conductive material such as aluminum, copper, and the like, without limiting the scope of the present invention. Each heatsink 286 terminates to opposite fin portions or thermal edges 308, 310. The fin portion 308, 310 may include a gate shape, may be pleated, planar, may present a plurality of slots or holes, may be formed as a bend to provide a thermal interface plane for an external heating or cooling device including but not limited to heater blankets and/or cooling jackets.

Those skilled in the art will appreciate that numerous other shapes of the fin portions 308, 310 can be utilized to provide better surface area for cooling or heating media, such as liquids, solids, or gasses, and the like, are introduced to the fin portions 308, 110 of each thermally conductive plate, sheet, or foil to either cool or to heat the cell packs 52.

Positive endplate 236 and negative endplate 238 act as a pair of compression plates sandwiching the framed heatsink assemblies 250, cell packs 52 and foam elements 40 therebetween. The positive endplate 236 is formed to include a pair of studs 325 displaced by a stud displacement 327 approximately equal to the opening displacement 278. Studs 325 are configured to receive the openings 276 on the distal edge of the positive terminal coupling surface 268 of the cell pack 52 adjacent the positive endplate 236 thereabout. The negative endplate 238 is formed to include is formed to include a pair of studs 345 displaced by a stud displacement 347 approximately equal to the opening displacement 278. Studs 345 are configured to receive the openings 276 on the distal edge of the negative terminal coupling surface 274 of the cell pack 52 adjacent the negative endplate 238 thereabout.

The positive endplate 236 and negative endplate 238 are fastened together to provide additional compressive force to the cell packs 52 and framed heatsink assemblies 250.

While only an odd P battery module 210 having three sequential cell packs terminals coupled in parallel which are coupled in series to the adjacent sequential cell packs 52 coupled in parallel a jumper tab 232 having three pairs of cooperating stud-receiving holes 294 is illustrated, it is within the contemplated scope of the disclosure for terminals of more than three sequential cell packs 52 sandwiching framed heat sink assemblies therebetween to be coupled in parallel to form a parallel cell group that is coupled in series with a like number of cell packs sandwiching heat sink assemblies therebetween coupled in parallel to form an adjacent parallel cell group utilizing appropriately configured jumper tabs and end jumper tabs and proper orientation of cell packs to form other configurations of odd P battery modules 210.

A scalable battery module 10, 210 of the present disclosure is adaptable to provide scalable electrical configurations. A large battery pack may be formed by coupling one or a plurality of scalable battery modules 10, 210 comprising a multitude of cells each sandwiched by respective heatsinks formed from thermally conductive materials such as, for example, flat stock aluminum alloy foils and the like, without limiting the scope of the present disclosure.

The basis for the electrical configuration in the disclosed scalable battery modules is the overlapping of the positive terminal of one parallel cell grouping and the negative terminal of an adjacent prismatic electrochemical cells to facilitate connecting parallel cell groupings in series. When the cell terminals are connected in this manner, a single parallel string (1P) is formed. Alternatively; the adjacent electrochemical cell pairs may be configured with their respective positive terminals overlapping each other and their respective negative terminals overlapping each other thus forming a parallel cell configuration (2P). To construct a string of parallel cells, the first grouping of two adjacent cells positive terminals are electrically connected to the adjacent cells negative terminals by use of an electrically conductive jumper tab. An alternating stack of cell pairs, positive terminals to negative terminals, can be strung together to achieve the desired electrical characteristics. To those skilled in the art, it is apparent that the series and parallel combinations present an infinite number of electrical configuration combinations.

This disclosed odd P scalable battery module 210 permits the configuration of an odd number of cells in parallel. For example, as shown in FIGS. 17-18, in assembling a 3P (three parallel) configuration, cell pack orientation alternates every three cell grouping i.e. the first three cells have their positive terminals to the left and their negative terminals to the right, the next three cell grouping have their negative terminals to the left and their positive terminals to the right. In detail, the first three cell grouping (cell numbers 1-3) have their positive terminals to one side; the next three cell grouping (cell numbers 4-6) have their positive terminals to the opposite side.

Assuming the orientation of the first cell pack 1752*a* of the first three cell grouping 1751*a* shown to the left of the drawing in FIG. 17 exhibits a base orientation, the configuration described above can be accomplished by rotating subsequent cells about their lateral and or longitudinal axis relative to the base orientation. In the illustrated embodiment, the second cell pack 1752*b* of the first cell grouping 1751*a* is rotated 180 degrees end over end about its lateral axis from the base orientation so that its negative terminal still faces forward in the drawing. Continuing, in the illustrated embodiment, the third cell pack 1752*c* of the first cell grouping 1751*a*, is placed in the base orientation with its negative terminal facing forward in the drawing. Continuing further, in the illustrated embodiment, the fourth cell pack 1752*d* which is the first cell pack of the second cell grouping 1751*b* is rotated 180 degrees side to side about its longitudinal axis from the base orientation so that its negative terminal faces rearward in the drawing and its positive terminal faces forward in the drawing. Continuing, in the illustrated embodiment, the fifth cell pack 1752*e* which is the second cell pack of the second cell grouping 1751*b* is rotated 180 degrees side to side about its longitudinal axis and 180 degrees end over end about its lateral axis from the base orientation so that its negative terminal faces rearward in the drawing and its positive terminal faces forward in the drawing. Continuing, further, in the illustrated embodiment, the sixth cell pack 1752*f* which is the third cell pack of the second cell grouping 1751*b* is rotated 180 degrees side to side about its longitudinal axis from the base orientation so that its negative terminal faces rearward in the drawing and its positive terminal faces forward in the drawing.

Continuing, the third set of three cell grouping (cell numbers 7-9) will return to having their positive terminals on the same side as the first three cell grouping (cells 1-3). This alternating pattern of positive terminals and negative terminals continues until the appropriate number of cell grouping are assembled to provide the desired electrical characteristics. For further clarification, by placing the first electrochemical cell grouping with its positive terminal overlapping the second cell grouping positive terminal and its negative terminal overlapping the second cell grouping negative terminal you create a 2P configuration. By adding a third electrochemical cell grouping with its positive cell terminal positioned on the same plane as the positive terminals of the previous two cell groupings and its negative terminal positioned on the same plane as the negative terminal of the previous two cell groupings, three positive terminals are presented on a common plane and three negative terminals are presented on an opposite common plane. The first three cell groupings negative terminals (cells 1-3) would be joined using an electrically conductive jumper tab and would form the negative end of a battery module. The first three cell groupings (cells 1-3) positive terminals would be joined with the next three cell groupings (cells 4-6) negative terminals with an electrically conductive jumper tab to place the first three cell groupings (cells 1-3) and the next three cell groupings (cells 4-6) in a series connection. The next three cell groupings (cells 4-6) positive terminals are joined to the negative terminals of the third set of three cell groupings (cells 7-9). This alternating connection method continues until the desired number of three parallel cell groupings (3P) in series is reached.

The disclosed scalable battery module is a battery cell interconnect system to provide scalable electrical configurations in the assembly of multiple electrochemical cells within a battery module. This electrical configurability will allow a plurality of battery cells to be assembled into an electrical series string, or an electrical parallel string, or any multiples there between. The disclosed scalable battery module is adaptable to be utilized in various electrical configurations including and not limited to the overlapping of positive terminals and negative terminals of prismatic electrochemical battery cells. Electrical conductive power bussing straps or jumper tabs are mechanically assembled onto the overlapping cell terminals to create the appropriate series/parallel configuration. The battery module has a plurality of battery cells, heatsink assemblies with the cells disposed therebetween. A plurality of rods extend through the each heatsink assemblies to secure the heatsink assemblies and the cell with one another to form the battery module or battery pack. A plurality of bands may also be used around the outline of module as a method to secure all components of the battery module or battery pack assembly, as described in co-owned U.S. Pat. No. 7,531,270, U.S. application Ser. Nos. 12/103,830, 12/463,548 the disclosures of which are incorporated herein by this reference.

While the disclosed scalable battery module has been described with reference to electric and hybrid electric vehicles, the disclosed scalable battery module may find applicability within the automotive, grid storage, military, and numerous consumer application markets within the scope of the disclosure. In particular, this invention promotes a scalable battery capacity and voltage solution to meet the varying requirements of the market's battery system needs.

The disclosed scalable battery module provides scalable capacity and voltage solutions for module or battery assemblies. The disclosed scalable battery module promotes the use of common product components to manufacture numerous end-product variations. This vastly reduces all development and manufacturing contributors that affect cost and time to market.

An advantage recognized by the disclosed scalable battery module is to provide a battery module with a very high energy density characteristic, wherein the high energy density is accomplished by assembling cells, power and data bussing devices, controllers, cooling, and retention architecture in the small volume of space thereby improving packaging characteristics and providing a compact product.

Another advantage recognized by the disclosed scalable battery module is to provide a battery module having excellent retention that surrounds and secures the cells.

Still another advantage recognized by the disclosed scalable battery module is to provide a battery module having excellent retention that surrounds and secures the electrode stack within the cell envelope from shifting.

Still another advantage recognized by the disclosed scalable battery module is to provide a scalable battery pack that reduces manufacturing costs due to simplified assembly methods.

Still another advantage recognized by the disclosed scalable battery module is to provide a scalable battery pack having a balanced thermal management system wherein each cell of the battery pack receives a similar temperature and flow of thermal management media to assist in the removing or adding heat.

Still another advantage recognized by the disclosed scalable battery module is to provide a cooling system which allows the battery pack to deliver and receive high rates of current, i.e. the C-rate by efficiently removing undesired heat during the rapid charge or discharge pulse that may negatively impact the performance and life span of the battery pack.

Still another advantage recognized by the disclosed scalable battery module is to provide heatsinks that may interface with a heating system to allow the battery pack to operate when exposed to temperatures below the optimal operating range of the cell chemistry.

Still another advantage recognized by the disclosed scalable battery module is to provide a pack that is simple in design and has a reduced mass.

The disclosed scalable battery module provides several advantages over the battery packs of the prior art by increasing an ambient temperature range at which the battery pack can operate. Also, the disclosed scalable battery module subject invention helps maintain the battery pack at an optimal operating temperature to extend the life cycle of the battery pack, and to increase battery pack safety.

While the invention has been described as example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. It is to be understood that the presently preferred embodiment of the present invention disclosed is representative of the subject matter which is broadly contemplated by the present invention, that the scope of the present invention fully encompasses other embodiments which may become obvious to those skilled in the art. All structural and functional equivalents to the elements of the above-described preferred embodiment that are known or later come to be known to those of ordinary skill in the art are expressly incorporated herein by reference and are intended to be encompassed by the present disclosure. Moreover, it is not necessary for a device or method to address each and every problem sought to be solved by the disclosed scalable battery module and method of making the same. Furthermore, no element, component, or method step in the present disclosure is intended to be dedicated to the public.

What is claimed is:

1. A scalable battery module having a longitudinal axis, the scalable battery module comprising:
    a plurality of similarly configured cell groupings arranged along and substantially perpendicular to the longitudinal axis of the scalable battery module and comprising a plurality of cell packs electrically coupled in parallel and arranged to be intersected by the longitudinal axis of the scalable battery module, each cell grouping of the plurality of cell groupings including a negative terminal and a positive terminal;
    a plurality of framed heatsink assemblies each having a thermally conductive sheet portion, a first framed heatsink assembly of the plurality of framed heat sink assemblies being disposed between one cell pack of the plurality of cell packs of one cell grouping of the plurality of cell groupings and another cell pack of the plurality of cell packs of the one cell grouping; and
    a plurality of jumper tabs arranged substantially parallel to the longitudinal axis of the scalable battery module, wherein each of the plurality of jumper tabs has a first connection point to a negative terminal of one of the plurality of cell groupings and a second connection point to a positive terminal of an adjacent cell grouping, the second connection point being spaced apart from the first connection point along the longitudinal axis, each of the plurality of jumper tabs electrically coupling the negative terminal of the one of the plurality of cell groupings to the positive terminal of the adjacent cell grouping;
    wherein the adjacent cell groupings that are electrically coupled together by the jumper tabs are arranged along the longitudinal axis of the battery module;
    wherein each of the plurality of framed heatsink assemblies comprises a first frame and a second frame, wherein the first frame and the second frame interlock, wherein the thermally conductive sheet portion of each of the plurality of framed heatsink assemblies is disposed longitudinally intermediate the first frame and the second frame, and
    wherein the first framed heatsink assembly of the plurality of framed heatsink assemblies includes at least one first stud configured to be connected to the negative terminal of the one cell grouping of the plurality of cell groupings, and at least one second stud configured to be connected to the positive terminal of the one cell grouping of the plurality of cell groupings.

2. The scalable battery module of claim 1 wherein each cell pack of the plurality of cell packs in each cell grouping are prismatic cell packs.

3. The scalable battery module of claim 1 wherein each cell pack of the plurality of cell packs include oppositely facing large area surfaces.

4. The scalable battery module of claim 3 wherein the negative and positive terminals of each cell grouping of the plurality of cell groupings each include a coupling surface of a corresponding terminal of each cell pack of the plurality of cell packs forming the cell grouping wherein the coupling surface extends laterally with respect to the oppositely facing large area surfaces.

5. The scalable battery module of claim 4 wherein the positive terminal of each cell pack positioned along a first edge of the cell pack and the negative terminal of each cell pack is positioned along a second edge opposite the first edge of the cell pack with the oppositely facing large area surfaces disposed between the positive terminal and negative terminal.

6. The scalable battery module of claim 5 wherein the coupling surfaces of the positive and negative terminals of each cell pack extend in the same direction laterally relative to the large area surfaces.

7. The scalable battery module of claim 6 wherein each coupling surface is formed to include openings along a distal edge.

8. The scalable battery module of claim 7 wherein the each heatsink assembly of the plurality of heatsink assemblies is a framed heatsink assembly including a heatsink portion and a frame portion with the thermally conductive sheet portion being framed by the frame portion.

9. The scalable battery module of claim 8 wherein the frame portion of each heatsink assembly of the plurality of heatsink assemblies is formed to include jumper tab capture features and coupling surface capture features.

10. The scalable battery module of claim 9 wherein the jumper tab capture features and coupling surface capture features comprise the at least one first stud.

11. The scalable battery module of claim 10 wherein the jumper tabs include a plurality of stud-receiving holes for receiving the at least one first stud therein.

12. The scalable battery module of claim 11 wherein the orientation of the cell groupings determines whether they are coupled in parallel or in series to an adjacent cell pack.

13. The scalable battery module of claim 1 wherein each cell grouping of the plurality of cell groupings has at least one large area surface in thermal conduction communication with the sheet portion of at least one heatsink assembly of the plurality of heatsink assemblies.

14. The scalable battery module of claim 1 wherein the each heatsink assembly of the plurality of heat sink assemblies includes thermal edges extending beyond a frame member.

15. The scalable battery module of claim 1, wherein:
the plurality of cell packs comprise lithium ion prismatic cell packs, each lithium ion prismatic cell pack including oppositely facing large area surfaces having oppositely facing first and second edges with the positive terminal extending beyond the first edge of the oppositely facing large area surfaces and the negative terminal extending beyond the second edge of the oppositely facing large area surfaces wherein the positive terminal includes a positive coupling surface extending laterally from the oppositely facing large area surfaces and having at least one opening formed in a distal edge of the coupling surface and the negative terminal includes a negative coupling surface extending laterally from the oppositely facing large area surfaces and having at least one opening formed in a distal edge of the coupling surface;
the plurality of framed heatsink assemblies each includes the thermally conductive sheet portion framed by a frame portion formed to include jumper tab capture features and coupling surface capture features including at least one threaded stud formed on opposite sides of the frame portion, each of the plurality of framed heat sink assemblies being disposed with the opening formed in the distal edge of the negative coupling surface of the one cell pack and the opening formed in the distal edge of the negative coupling surface of the adjacent cell pack combining to surround portions of the at least one threaded stud on one side of the frame portion and with the opening formed in the distal edge of the positive coupling surface of the one cell pack and the opening formed in the distal edge of the positive coupling surface of the adjacent cell pack combining to surround portions of the at least one threaded stud on the opposite side of the frame portion; and
each of the plurality of jumper tabs is formed to include a plurality of stud-receiving holes each receiving a threaded stud therein, at least one of the stud-receiving holes receiving a threaded stud with portions surrounded by cooperating openings in the distal edges of coupling surfaces.

16. The scalable battery module of claim 15 further comprising a plurality of nuts each received on threaded stud to maintain the jumper tab in engagement with a positive or negative terminal of a cell grouping.

17. The scalable battery module of claim 16 wherein at least one of the plurality of nuts is received on a threaded stud with portions surrounded by cooperating openings in the distal edges of coupling surfaces to maintain the jumper tab in engagement with the coupling surfaces.

18. The scalable battery module of claim 15 wherein each of the plurality of framed heatsink assemblies includes at least two pairs of threaded studs, each pair of threaded studs being formed on opposite sides of the frame portion and being spaced apart by a displacement and each distal edge of each coupling surface being formed to include a pair of openings spaced apart from each other by a displacement substantially equal to the displacement of one of the pairs of studs formed on each framed heatsink assembly.

19. The scalable battery module of claim 18 wherein each cell grouping includes an odd number of cell packs electrically coupled in parallel.

20. The scalable battery module of claim 19 wherein the pair of threaded studs on one side of each framed heat sink assembly are spaced apart by a first displacement and the pair of threaded studs on the opposite side of each framed heat sink assembly are spaced apart by a second displacement different from the first displacement, the openings formed in the distal edge of each negative coupling surface are spaced apart by a displacement substantially equal to the first displacement and the openings formed in the distal edge of each positive coupling surface are spaced apart by a displacement substantially equal to the second displacement and each of the plurality of jumper tabs is formed to include at least a first pair of stud-receiving holes spaced apart by a displacement substantially equal to the first displacement each of the first pair of stud-receiving holes receiving a threaded stud from one side of a first framed heatsink assembly therein and at least a second pair of stud-receiving holes spaced apart by a displacement substantially equal to the second displacement each of the second pair of stud-receiving holes receiving a threaded stud from the other side of a second framed heatsink assembly adjacent to the first heat sink assembly therein.

21. The scalable battery module of claim 1, wherein each of the plurality of jumper tabs has a width and each of the plurality of framed heatsink assemblies has a thickness, wherein each of the plurality of jumper tabs has a first connector and a second connector, the first connector electrically coupling with the negative terminal of one of the plurality of cell groupings and the second connector electrically coupling with the positive terminal of the adjacent cell grouping, the first connector and the second connector spaced along the width of each of the plurality of jumper tabs, the width of each of the plurality of jumper tabs being less than twice the thickness of each of the plurality of framed heatsink assemblies.

22. The scalable battery module of claim 1, wherein each of the plurality of jumper tabs has a width and each of the plurality of framed heatsink assemblies has a thickness, wherein each of the plurality of jumper tabs has a first connector and a second connector, the first connector electrically coupling with the negative terminal of one of the plurality of cell groupings and the second connector electrically coupling with the positive terminal of the adjacent cell grouping, the first connector and the second connector spaced along the width of each of the plurality of jumper tabs, the width of each of the plurality of jumper tabs being less than three times the thickness of each of the plurality of framed heatsink assemblies.

23. The scalable battery module of claim 1, wherein the negative terminal of each of the plurality of similarly configured cell groupings extends transverse to the longitudinal axis of the scalable battery module and the positive terminal of each of the plurality of similarly configured cell groupings extends transverse to the longitudinal axis of the scalable battery module, each of the plurality of jumper tabs has a width extending along the longitudinal axis of the scalable battery module, each of the plurality of similarly configured cell groupings has a thickness, each of the plurality of jumper tabs having a negative terminal receiving hole receiving the negative terminal of the one of the plurality of cell groupings and a positive terminal receiving hole receiving the positive terminal of the adjacent cell grouping, the negative terminal receiving hole and the positive terminal receiving hole spaced along the width of the jumper tab a distance approximately equal to the thickness of each of the plurality of the similarly configured cell groupings.

24. The scalable battery module of claim 1, wherein each of the plurality of jumper tabs are electrically coupled to a flexible circuit.

25. The scalable battery module of claim 1, wherein each one of the plurality of framed heatsink assemblies interlocks with at least an adjacent one of the plurality of framed heatsink assemblies.

26. The scalable battery module of claim 1, wherein the one cell pack of the plurality of cell packs of the one cell grouping of the plurality of cell groupings has a first negative terminal connected to the at least one first stud that is configured to be connected to the negative terminal and a first positive terminal connected to the at least one second stud that is configured to be connected to the positive terminal, and the other cell pack of the plurality of cell packs of the one cell grouping of the plurality of cell groupings has a second negative terminal connected to the at least one first stud that is configured to be connected to the negative terminal and a second positive terminal connected to the at least one second stud that is configured to be connected to the positive terminal.

* * * * *